US011232644B1

(12) United States Patent
Lee

(10) Patent No.: US 11,232,644 B1
(45) Date of Patent: Jan. 25, 2022

(54) SYSTEMS AND METHODS FOR PROVIDING SPATIAL AWARENESS IN VIRTUAL REALITY

(71) Applicant: Facebook Technologies, LLC, Menlo Park, CA (US)

(72) Inventor: Eugene Lee, Mountain View, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 17/139,434

(22) Filed: Dec. 31, 2020

(51) Int. Cl.
*G06T 19/00* (2011.01)
*G02B 27/01* (2006.01)
*G02B 27/00* (2006.01)
*G06F 3/0481* (2013.01)

(52) U.S. Cl.
CPC ........ *G06T 19/006* (2013.01); *G02B 27/0093* (2013.01); *G02B 27/017* (2013.01); *G06F 3/04815* (2013.01)

(58) Field of Classification Search
CPC .... G06T 19/006; G06F 3/04815; G06F 3/011; G02B 27/017; G02B 27/0093
See application file for complete search history.

(56) References Cited

U.S. PATENT DOCUMENTS

| 2015/0094142 | A1* | 4/2015 | Stafford | G06F 3/017 463/31 |
| 2016/0313790 | A1* | 10/2016 | Clement | G02B 27/0093 |
| 2018/0136716 | A1* | 5/2018 | Kuehne | G02B 27/017 |
| 2018/0278908 | A1* | 9/2018 | Ross | G06T 19/006 |
| 2019/0043259 | A1* | 2/2019 | Wang | G06F 3/012 |

* cited by examiner

*Primary Examiner* — Jeffery A Brier
(74) *Attorney, Agent, or Firm* — Baker Botts L.L.P.

(57) ABSTRACT

In one embodiment, a method includes rendering, for one or more displays of a VR device, a first output image of a VR environment based on a user's field of view. The VR environment has a virtual boundary corresponding to a real-world environment. The method further includes determining whether the user is approaching a threshold distance of the virtual boundary and determines the user's direction of movement and field of view, accessing one or more images of the real-world environment captured by one or more cameras of the VR device, and rendering a second output image comprising a portion of the VR environment and a portion of a passthrough view of the real-world environment based on the accessed images. The portion of the passthrough view is based on the determined direction of movement and the field of view of the user.

20 Claims, 14 Drawing Sheets

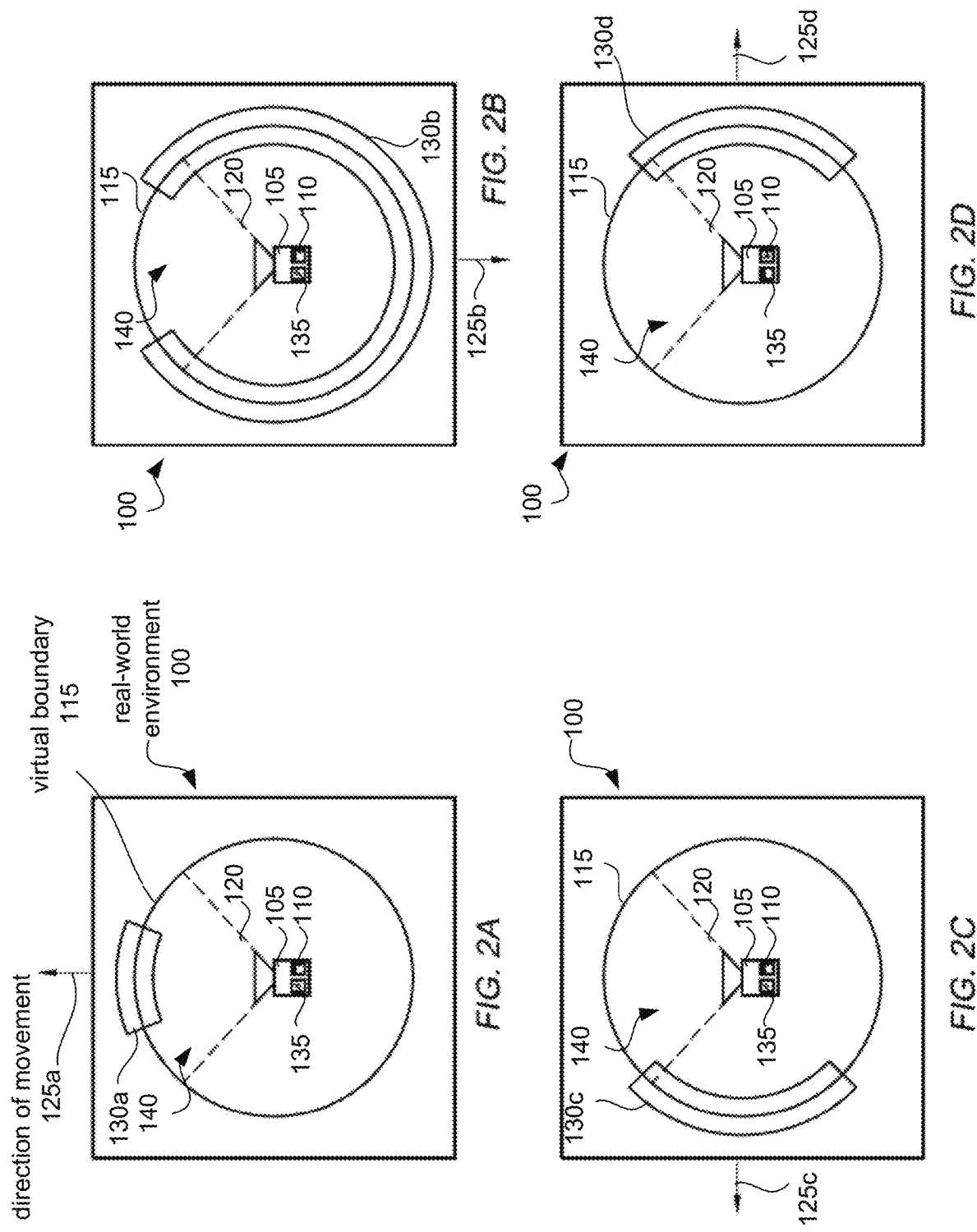

SYSTEMS AND METHODS FOR PROVIDING SPATIAL AWARENESS IN VIRTUAL REALITY

TECHNICAL FIELD

This disclosure generally relates to databases and file management within network environments, and in particular relates to determining spatial awareness in a virtual reality (VR) setting.

BACKGROUND

Traditional methods of spatial awareness in VR settings require a user to define a boundary wall that represents the outer bounds of a safe boundary perimeter for the user to move around in. For example, the user can draw a line on the floor in a room as the boundary (e.g., for a room-scale VR setting) or have a computer system automatically defining a circular perimeter centered on a stationary sitting or standing user (e.g., for a stationary VR setting). As the user or the user's hands approaches the boundary, a virtual wall can appear to alert the user they are approaching the boundary. For room-scale VR users, the user may have a small room where the virtual wall constantly appears, frustrating the user experience and breaking the VR immersion. For stationary VR users, the user may constantly see the virtual wall as their head and/or hands move, causing some users to feel enclosed and claustrophobic. Further, in some situations, like if the user is move backwards out of the boundary, the virtual wall may not appear within the user's field of view until it is too late, risking injury to the user if they are moving too quickly.

SUMMARY OF PARTICULAR EMBODIMENTS

In particular embodiments, a user of an immersive VR system may have their view of the real-world environment partially or fully occluded by the VR system, and thus risk running into or hitting real-world objects while immersed in a VR environment. Additionally, immersion in the VR environment may disorient the user as to their position and/or orientation in the real-world environment. That is, the user may forget where they were standing, or where furniture or other objects in their vicinity are. Thus, one technical challenge may include maintaining an immersive VR experience while also conveying spatial information about the real-world environment to a user immersed in the VR experience. Traditional methods of keeping the user safe and helping the user orient themselves in a VR environment include drawing of a virtual boundary, which may be a line drawn by a user that defines a safe zone for the user while they are in the VR experience. As the user approaches the boundary, a virtual boundary wall may appear or activate. The system can use the virtual boundary wall to alert the user where the virtual boundary is. For example, these virtual boundary walls may have grid-like appearances corresponding to the line drawn by the user defining the virtual boundary. But these boundary walls can disrupt the immersion while in the VR environment, detracting from the user's experience. One solution presented by the embodiments disclosed herein to address the technical challenge of conveying spatial information about the real-world to the user may be to provide a "directional" passthrough view of the real-world environment within the VR environment as the user approaches the virtual boundary. The passthrough view may be considered "directional" in that the area and position of the passthrough view may be based on the user's relative movement and field of view in the VR environment. While in the directional passthrough view, the user can see where the virtual boundary (e.g., the virtual line drawn by the user) is, to help the user stay in the safe zone. A technical advantage of the embodiments may include providing the pose (e.g., position and orientation) of the user in the real-world environment, and providing spatial information by showing the user a quick glimpse of the real-world environment while maintaining the VR experience, providing the user with visual information that can help the user avoid objects outside of the boundary as well as help the user reorient themselves in the real-world environment. As an example and not by way of limitation, a user walking forward may be approaching a desk that lies outside of the virtual boundary. Without fully breaking the VR immersion, a portion of the user's field of view may transition from a rendering of the VR environment to a rendering of a directional passthrough view of the real-world environment (and accordingly, the desk that lies in the user's path) to help the user avoid running into the desk and to help the user reorient themselves in the middle of the VR boundary. Although this disclosure describes a method of providing spatial awareness in a VR setting using directional passthrough, this disclosure contemplates providing spatial awareness in a VR setting in any suitable manner.

In particular embodiments, one or more computing systems may render, for one or more displays of a VR display device, a first output image of a VR environment based on a field of view of a user. The VR environment can comprise a virtual boundary corresponding to a real-world environment. The one or more computing systems can determine whether the user is approaching within a first threshold distance of the virtual boundary. The one or more computing systems can determine, responsive to the user approaching within the first threshold distance of the virtual boundary, a direction of movement and the field of view of the user. The one or more computing systems can access one or more images of the real-world environment captured by one or more cameras of the VR display device. The one or more computing systems can render, for the one or more displays of the VR display device, a second output image comprising a portion of the VR environment and a portion of a passthrough view of the real-world environment based on the accessed images. The portion of the passthrough view may be based on the determined direction of movement and the field of view of the user.

Certain technical challenges exist for determining spatial awareness in a VR setting. One technical challenge may include conveying spatial information about the real-world environment and objects within the real-world environment to a user while the user is immersed in a VR experience. The solution presented by the embodiments disclosed herein to address this challenge may be to provide a quick glimpse via a directional passthrough view to the real-world environment so the user can ascertain where they are in the real-world environment. Another technical challenge may include maintaining the immersion of the VR experience while also providing the user with the necessary visual information to orient themselves in the virtual boundary. The solution presented by the embodiments disclosed herein to address this challenge may be to render an opaque, translucent, or otherwise outlined rendering of a real-world object in the VR environment which can alert the user to the presence of the real-world object, without significantly interrupting the VR experience.

Certain embodiments disclosed herein may provide one or more technical advantages. A technical advantage of the embodiments may include providing spatial information by providing quick glimpse of the real-world environment through directional passthrough views of the real-world environment while immersed in the VR environment, or providing outline renderings of real-world objects in the VR environment to alert the user of objects that may lie in their path without significantly disrupting the immersion of the VR experience. Another technical advantage of the embodiments may include providing spatial information by determining the optimal direction for the directional passthrough view, regardless of which direction the user is moving. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, may be claimed in another claim category, e.g. system, as well. The dependencies or references back in the attached claims are chosen for formal reasons only. However any subject matter resulting from a deliberate reference back to any previous claims (in particular multiple dependencies) may be claimed as well, so that any combination of claims and the features thereof are disclosed and may be claimed regardless of the dependencies chosen in the attached claims. The subject-matter which may be claimed comprises not only the combinations of features as set out in the attached claims but also any other combination of features in the claims, wherein each feature mentioned in the claims may be combined with any other feature or combination of other features in the claims. Furthermore, any of the embodiments and features described or depicted herein may be claimed in a separate claim and/or in any combination with any embodiment or feature described or depicted herein or with any of the features of the attached claims.

BRIEF DESCRIPTION OF THE DRAWINGS

FIGS. 2A-2D illustrate top-down views of passthrough views of the real-world environment within the virtual reality environment.

DESCRIPTION OF EXAMPLE EMBODIMENTS

Figure 1A:
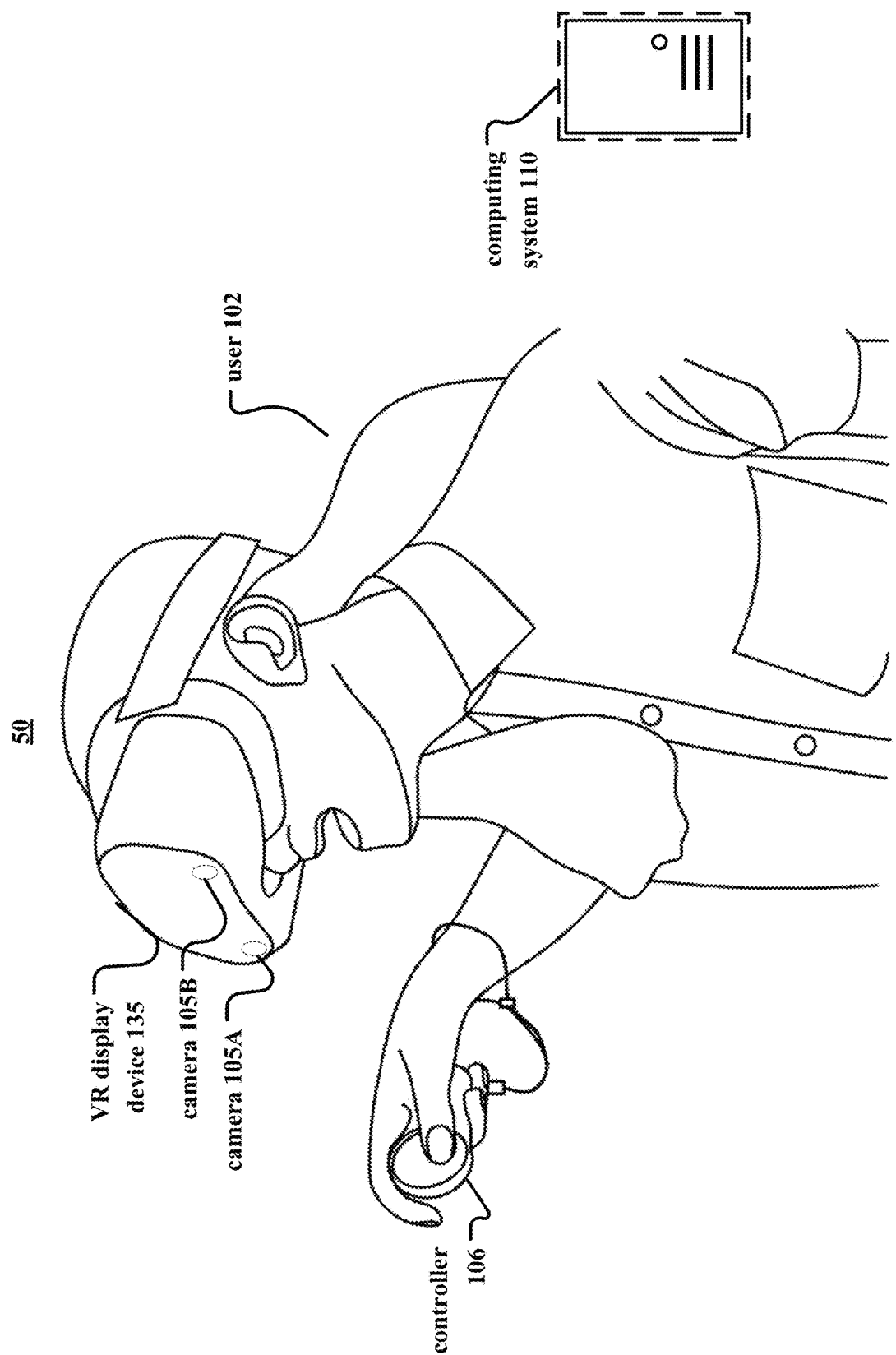
FIG. 1A illustrates an example artificial reality system worn by a user, in accordance with particular embodiments.

In particular embodiments, a user of an immersive VR system (e.g., head-mounted VR goggles) may have their view of the real-world environment partially or fully occluded by the VR system, and thus risk running into or hitting real-world objects while immersed in a VR environment. Additionally, immersion in the VR environment may disorient the user as to their position and/or orientation in the real-world environment. That is, the user may forget where they were standing, or where furniture or other objects in their vicinity are. Thus, one technical challenge may include maintaining an immersive VR experience while also conveying spatial information about the real-world environment to a user immersed in the VR experience. Traditional methods of keeping the user safe and helping the user orient themselves in a VR environment include drawing of a virtual boundary, which may be a line drawn by a user that defines a safe zone for the user while they are in the VR experience. As the user approaches the boundary, a virtual boundary wall may appear or activate. The system can use the virtual boundary wall to alert the user where the virtual boundary is. For example, these virtual boundary walls may have grid-like appearances corresponding to the line drawn by the user defining the virtual boundary. But these boundary walls can disrupt the immersion while in the VR environment, detracting from the user's experience. One solution presented by the embodiments disclosed herein to address the technical challenge of conveying spatial information about the real-world to the user may be to provide a "directional" passthrough view of the real-world environment within the VR environment as the user approaches the virtual boundary. The passthrough view may be considered "directional" in that the area and position of the passthrough view may be based on the user's relative movement and field of view in the VR environment. While in the directional passthrough view, the user can see where the virtual boundary (e.g., the virtual line drawn by the user) is, to help the user stay in the safe zone. A technical advantage of the embodiments may include providing the pose (e.g., position and orientation) of the user in the real-world environment, and providing spatial information by showing the user a quick glimpse of the real-world environment while maintaining the VR experience, providing the user with visual information that can help the user avoid objects outside of the boundary as well as help the user reorient themselves in the real-world environment. As an example and not by way of limitation, a user walking forward may be approaching a desk that lies outside of the virtual boundary. Without fully breaking the VR immersion, a portion of the user's field of view may transition from a rendering of the VR environment to a rendering of a directional passthrough view of the real-world environment (and accordingly, the desk that lies in the user's path) to help the user avoid running into the desk and to help the user reorient themselves in the middle of the VR boundary. Although this disclosure describes a method of providing spatial awareness in a VR setting using directional passthrough, this disclosure contemplates providing spatial awareness in a VR setting in any suitable manner.

FIG. 1A illustrates an example of a virtual reality system 50 worn by a user 102. In particular embodiments, the virtual reality system 50 may comprise a head-mounted VR display device 135, a controller 106, and a computing system 110. The VR display device 135 may be worn over the user's eyes and provide visual content to the user 102 through internal displays (not shown). The VR display device 135 may have two separate internal displays, one for each eye of the user 102 (single display devices are also possible). As illustrated in FIG. 1A, the VR display device 135 may completely cover the user's field of view. By being the exclusive provider of visual information to the user 102, the VR display device 135 achieves the goal of providing an immersive artificial-reality experience. One consequence of this, however, is that the user 102 may not be able to see the physical (real-world) environment surrounding him, as his vision is shielded by the VR display device 135. As such, the passthrough feature described herein may be technically advantageous for providing the user with real-time visual information about his physical surroundings.

Figure 1B:
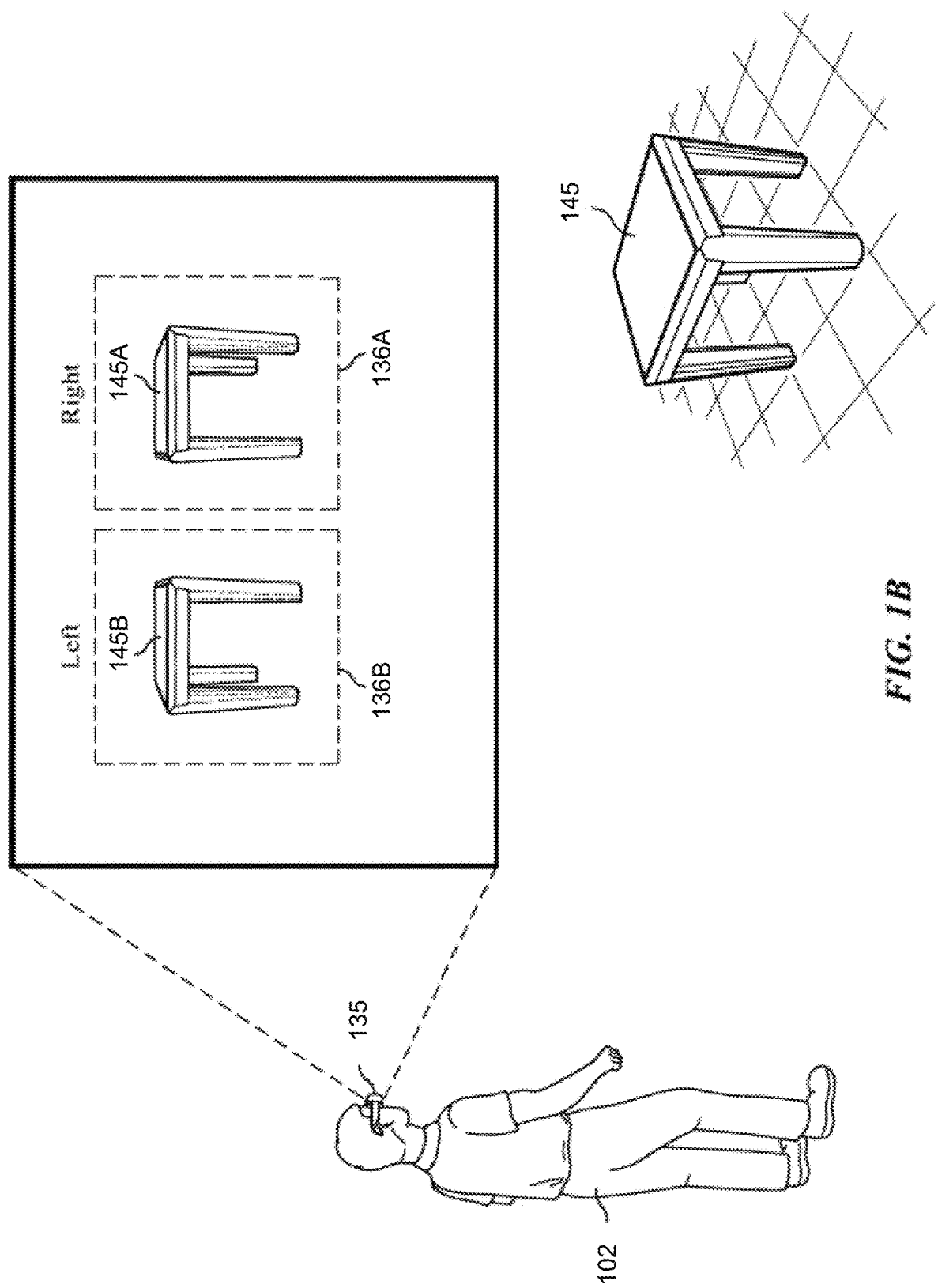
FIG. 1B illustrates an example of a passthrough feature, in accordance with particular embodiments.

FIG. 1B illustrates an example of the passthrough feature. A user 102 may be wearing a VR display device 135, immersed within a virtual reality environment. A real-world object 145 is in the physical environment surrounding the user 102. However, due to the VR display device 135 blocking the vision of the user 102, the user 102 is unable to directly see the real-world object 145. To help the user perceive his physical surroundings while wearing the VR display device 135, the passthrough feature captures information about the physical environment using, for example, the aforementioned external-facing cameras 105A-B. The captured information may then be re-projected to the user 102 based on his viewpoints. In particular embodiments where the VR display device 135 has a right display 136A for the user's right eye and a left display 136B for the user's left eye, the virtual reality system 50 may individually render (1) a re-projected view 145A of the physical environment for the right display 135A based on a viewpoint of the user's right eye and (2) a re-projected view 145B of the physical environment for the left display 135B based on a viewpoint of the user's left eye.

Referring again to FIG. 1A, the VR display device 135 may have external-facing cameras, such as the two forward-facing cameras 105A and 105B shown in FIG. 1A. While only two forward-facing cameras 105A-B are shown, the VR display device 135 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras may be configured to capture the physical environment around the user and may do so continuously to generate a sequence of frames (e.g., as a video). As previously explained, although images captured by the forward-facing cameras 105A-B may be directly displayed to the user 102 via the VR display device 135, doing so may not provide the user with an accurate view of the physical environment since the cameras 105A-B cannot physically be located at the exact same location as the user's eyes. As such, the passthrough feature described herein may use a re-projection technique that generates a 3D representation of the physical environment and then renders images based on the 3D representation from the viewpoints of the user's eyes.

The 3D representation may be generated based on depth measurements of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, the virtual reality system 50 could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the VR display device 135 within the environment may be needed. For example, in order to render the appropriate display for the user 102 while he is moving about in a virtual environment, the virtual reality system 50 may need to determine his position and orientation at any moment. Based on the pose of the VR display device, the virtual reality system 50 may further determine the viewpoint of either of the cameras 105A and 105B or either of the user's eyes. In particular embodiments, the VR display device 135 may be equipped with inertial-measurement units ("IMU"). The data generated by the IMU, along with the stereo imagery captured by the external-facing cameras 105A-B, allow the virtual reality system 50 to compute the pose of the VR display device 135 using, for example, SLAM (simultaneous localization and mapping) or other suitable techniques.

In particular embodiments, the virtual reality system 50 may further have one or more controllers 106 that enable the user 102 to provide inputs. The controller 106 may communicate with the VR display device 135 or a separate computing system 110 via a wireless or wired connection. The controller 106 may have any number of buttons or other mechanical input mechanisms. In addition, the controller 106 may have an IMU so that the pose of the controller 106 may be tracked. The controller 106 may further be tracked based on predetermined patterns on the controller. For example, the controller 106 may have several infrared LEDs or other known observable features that collectively form a predetermined pattern. Using a sensor or camera, the virtual reality system 50 may be able to capture an image of the predetermined pattern on the controller. Based on the observed orientation of those patterns, the system may compute the controller's position and orientation relative to the sensor or camera.

The virtual reality system 50 may further include a computing system 110. The computing system 110 may be a stand-alone unit that is physically separate from the VR display device 135 or the computer system 110 may be integrated with the VR display device 135. In embodiments where the computing system 110 is a separate unit, the computing system 110 may be communicatively coupled to the VR display device 135 via a wireless or wired link. The computing system 110 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by a virtual reality system 50 depends on the capabilities of its computing system 110.

In embodiments where the computing system 110 is a high-performance device, an embodiment of the passthrough feature may be designed as follows. Through the external-facing cameras 105A-B of the VR display device 135, a sequence of images of the surrounding physical environment may be captured. The information captured by the cameras 105A-B, however, may be misaligned with what the user's eyes may capture since the cameras could not spatially coincide with the user's eyes (e.g., the cameras may be located some distance away from the user's eyes and, consequently, have different viewpoints). As such, simply displaying what the cameras captured to the user may not be an accurate representation of what the user should perceive.

Instead of simply displaying what was captured, the passthrough feature may re-project information captured by the external-facing cameras 105A-B to the user. Each pair of simultaneously captured stereo images may be used to estimate the depths of observed features. As explained above, to measure depth using triangulation, the computing system 110 may find correspondences between the stereo images. For example, the computing system 110 may determine which two pixels in the pair of stereo images correspond to the same observed feature. A high-performance computing system 110 may solve the correspondence problem using its GPU and optical flow techniques, which are optimized for such tasks. The correspondence information may then be used to compute depths using triangulation techniques. Based on the computed depths of the observed features, the computing system 110 could determine where those features are located within a 3D space (since the computing system 110 also knows where the cameras are in that 3D space). The result may be represented by a dense 3D point cloud, with each point corresponding to an observed feature. The dense point cloud may then be used to generate 3D models of objects in the environment. When the system renders a scene for display, the system could perform visibility tests from the perspectives of the user's eyes. For example, the system may cast rays into the 3D space from a viewpoint that corresponds to each eye of the user. In this manner, the rendered scene that is displayed to the user may be computed from the perspective of the user's eyes, rather than from the perspective of the external-facing cameras 105A-B.

The process described above, however, may not be feasible for a resource-limited computing unit (e.g., a mobile phone may be the main computational unit for the VR display device). For example, unlike systems with powerful computational resources and ample energy sources, a mobile phone cannot rely on GPUs and computationally-expensive algorithms (e.g., optical flow) to perform depth measurements and generate an accurate 3D model of the environment. Thus, to provide passthrough on resource-limited devices, an optimized process is needed.

In particular embodiments, the computing device may be configured to dynamically determine, at runtime, whether it is capable of or able to generate depth measurements using (1) the GPU and optical flow or (2) the optimized technique using video encoder and motion vectors, as described in further detail below. For example, if the device has a GPU and sufficient power budget (e.g., it is plugged into a power source, has a full battery, etc.), it may perform depth measurements using its GPU and optical flow. However, if the device does not have a GPU or has a stringent power budget, then it may opt for the optimized method for computing depths.

Figure 1C:
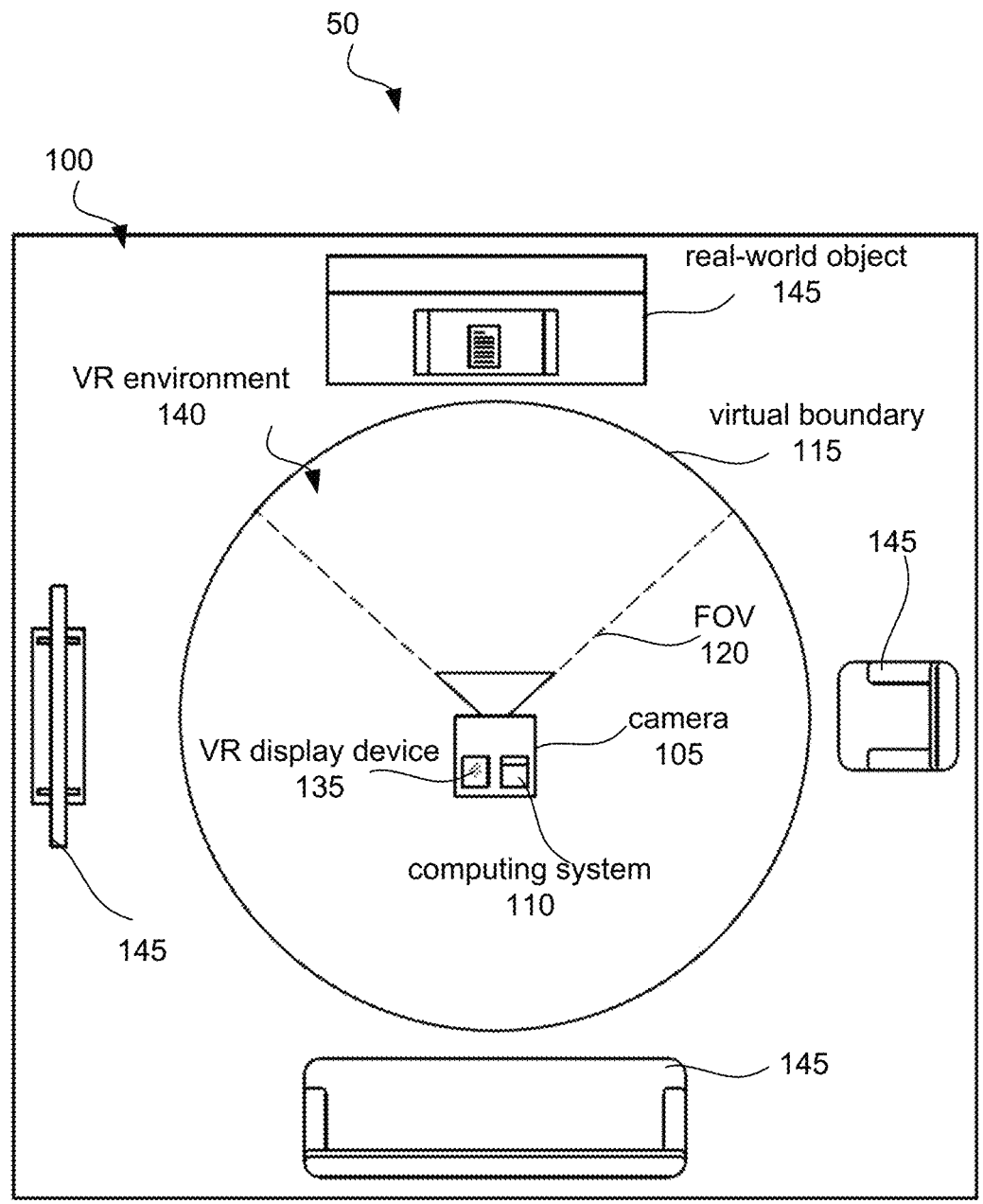
FIG. 1C illustrates a virtual reality system within a real-world environment.

FIG. 1C illustrates a virtual reality system 50 within a real-world environment 100. Within the real-world environment 100 may be a camera 105 (e.g., one or more cameras, front facing cameras on an AR/VR headset, etc.). The camera 105 may be connected to a computing system 110. The camera 105 may be worn by a user (e.g., as part of a VR headset). The camera 105 may be connected to a VR display device 135 (in particular embodiments, the camera 105 and the VR display device 135 may be separate). In particular embodiments, the computing system 110 may render, for one or more displays of the VR display device 135, a first output image of the VR environment 140 based on a field of view 120 of a user. The VR environment 140 may have a virtual boundary 115 corresponding to the real-world environment 100. The VR environment 140 may be a VR game, VR office, or other VR setting that is displayed in the field of view 120 of the user. The virtual boundary 115 may define or drawn mark the edge of a safe area for the user to explore while the user is immersed in the VR environment 140. For example, in a room-scale VR environment (where the user can walk around a room during the VR experience) the virtual boundary 115 may correspond to real-world objects 145 (e.g., sofas, chairs, tables, walls, impediments, etc.) that the user wearing the VR display device 135 may like to avoid while immersed in the VR experience. As another example, in a stationary VR setting (e.g., when the user is standing or sitting in a spot without traversing), the virtual boundary 115 may correspond to real-world objects at or just beyond arm's reach of the user (e.g., a 1 meter radius around the user). The virtual boundary 115 may be drawn by the user (e.g., by having the user manually draw the virtual boundary 115 using the controller 106), automatically determined (e.g., an image processor may determine a safe boundary and automatically determines the boundary wall), or semi-automatically determined (e.g., an image processor may determine or suggest a safe boundary and the boundary wall 115, and the user may manually augment or edit the determined boundary wall 115). Although this disclosure describes using a particular virtual reality system in a particular real-world environment, this disclosure contemplates using any suitable virtual reality system in any suitable real-world environment.

In particular embodiments, the computing system 110 may determine whether the user is approaching within a first threshold distance of the virtual boundary 115. The computing system 110 may determine whether the user is approaching within a first threshold distance of the virtual boundary 115 using sensors, accelerometers, gyroscopes, or other position sensors of the camera 105 and/or the VR display device 135. The first threshold distance may be a predetermined distance (e.g., 1, 5, 10, etc. meters) from the virtual boundary 115. The first threshold distance may be determined by the user as well. As an example and not by way of limitation, in a room-scale VR setting, the computing system 110 may determine whether the user is approaching within a pre-determined distance of the virtual boundary 115. As another example and not by way of limitation, in a stationary VR setting, the first threshold distance may be when the user's head or hands approach the edge of the predetermined radius around the user (e.g., when the user's head or hands approaches a pre-determined 1 meter radius). Although this disclosure describes determining whether the user is approaching within a particular threshold distance of the virtual boundary in a particular manner, this disclosure contemplates determining whether the user is approaching within any suitable threshold distance of the virtual boundary in any suitable manner.

Figure 1D:
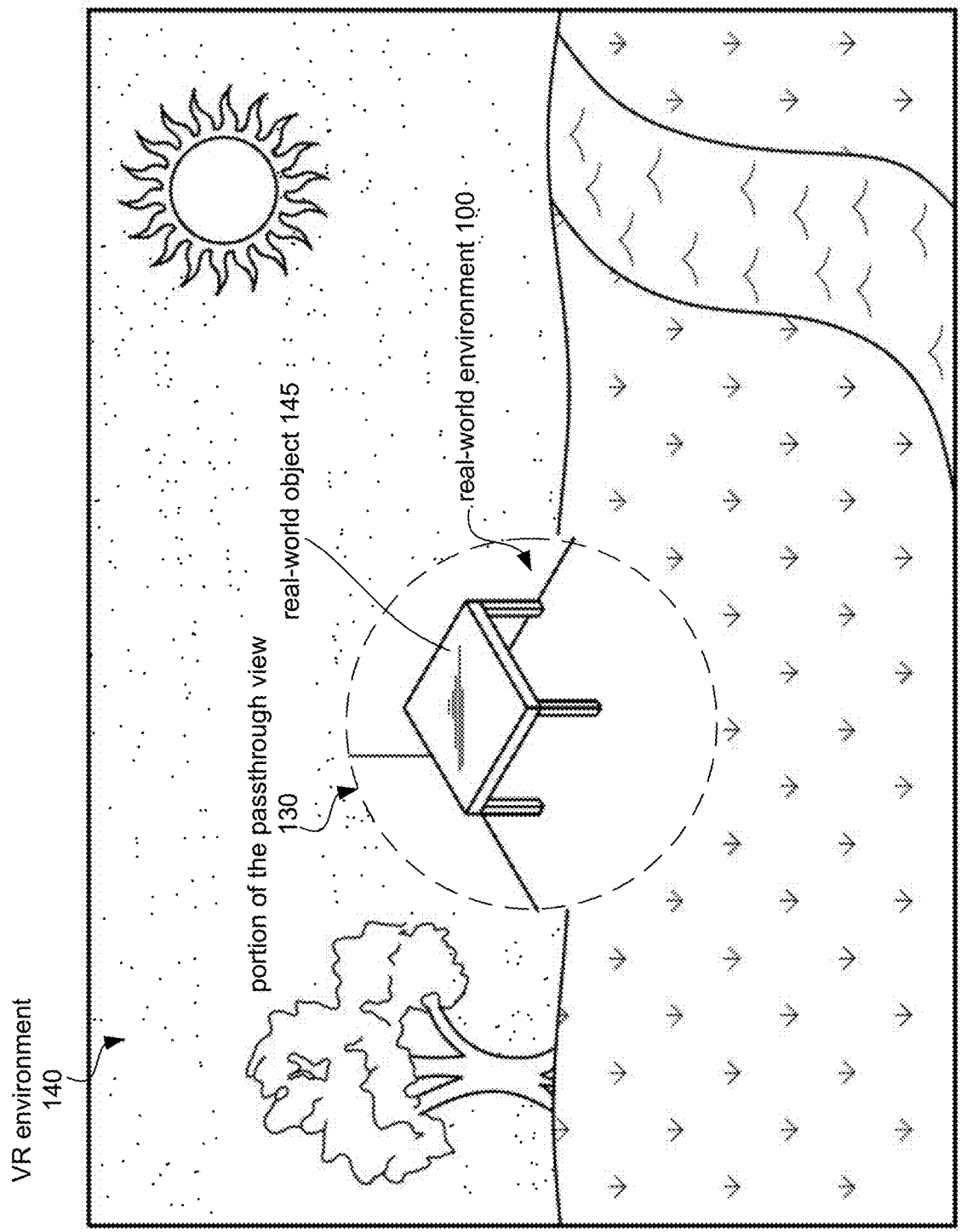
FIG. 1D illustrates a perspective view of a passthrough view of the real-world environment within the virtual reality environment.
Figure 3A:
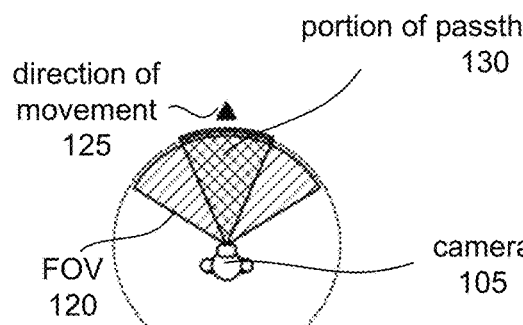
FIGS. 3A-3D illustrates sample perspective views of the passthrough view of the real-world environment within the virtual reality environment, without an adjustment for the field of view.
Figure 3B:
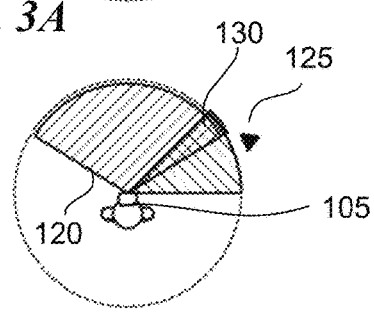
Figure 3C:
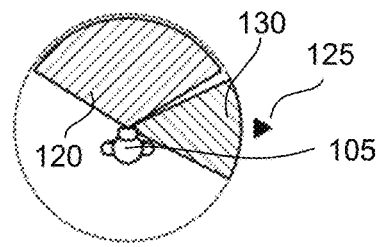
Figure 3D:
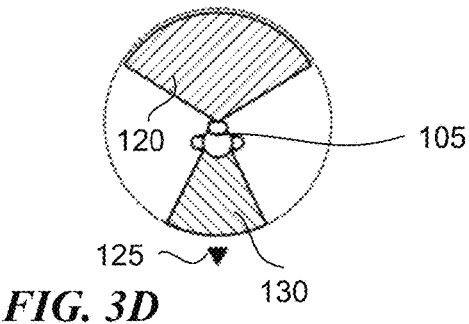
Figure 4A:
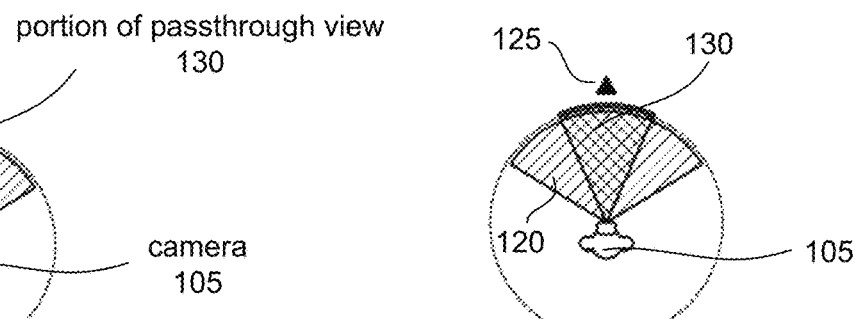
FIGS. 4A-4D illustrates sample perspective views of the passthrough view of the real-world environment within the virtual reality environment, with an adjustment for the field of view.
Figure 4B:
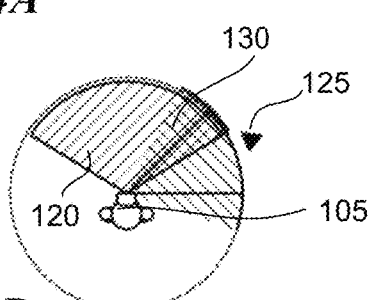
Figure 4C:
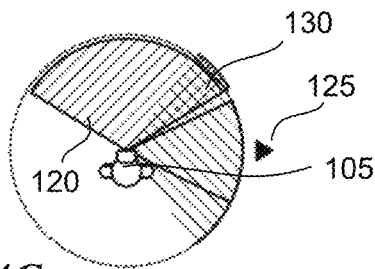
Figure 4D:
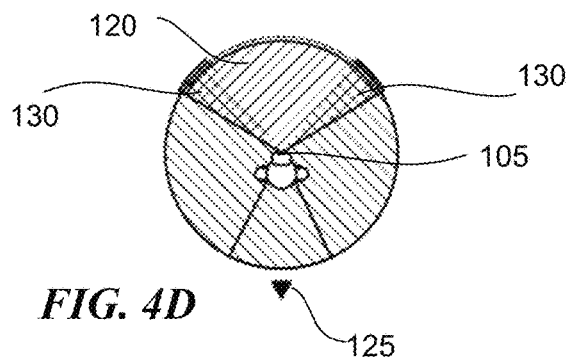

FIG. 1D illustrates a perspective view of a passthrough view 130 of the real-world environment 100 within the VR environment 140. The VR environment 140 may be rendered within the real-world environment 100. As a user approaches a virtual boundary, a portion of the passthrough view 130 can appear to show the user a real-world object that the user may risk running into (e.g., the real-world object 145). Thus, as the user gets close to the virtual boundary, a portion of the rendering of the VR environment 140 may transition to appear as a rendering showing the portion of the passthrough view 130. The portion of the passthrough view 130 can show the user the real-world environment 100, which may have the real-world object in the user's path, to prevent the user from risk of injury by showing the user the real-world object that may lie beyond the virtual boundary if the user continues along their path. The rendering as shown in FIG. 1D may be presented to the user through the VR display device 135 shown in FIG. 1B. That is, the portion of the passthrough view 130 may be used to capture information about the real-world object 145 in the real-world environment 100 and re-projected to the user.

FIGS. 2A-2D illustrate top-down views of passthrough views 130 of the real-world environment 100 within the VR environment 140. In particular embodiments, the computing system 110 may determine, responsive to the user approaching within the first threshold distance of the virtual boundary 115, a direction of movement 125 and the field of view 120 of the user. The computing system 110 may determine the direction of movement 125 and the field of view 120 of the user using sensors, accelerometers, gyroscopes, or other position sensors of the camera 105 and/or the VR display device 135 to determine the motion and orientation of the user wearing the camera 105 and/or the VR display device 135. As an example and not by way of limitation, sensors may determine the user is moving forward (e.g., in the direction of movement 125*a*) along the same direction as their field of view 120 (FIG. 2A). As another example and not by way of limitation, sensors may determine the user is moving backward (e.g., in the direction of movement 125*b*) in the opposite direction as their field of view 120 (FIG. 2B). As another example and not by way of limitation, sensors may determine the user is moving sideways to the left (e.g., in the direction of movement 125*c*) and perpendicular to their field of view 120 (FIG. 2C). As another example and not by way of limitation, sensors may determine the user is moving sideways to the right (e.g., in the direction of movement 125*d*) and perpendicular to their field of view 120 (FIG. 2D). Although this disclosure describes determining the direction of movement and the field of view of the user, this disclosure contemplates determining a direction of movement and the field of view of the user in any suitable manner.

In particular embodiments, the computing system 110 may access one or more images of the real-world environment 100 captured by one or more cameras 105 of the VR display device 135. The computing system 110 may access one or more images of the real-world environment 100 by capturing an image (e.g., by taking a picture or snapshot) of the user's real-world environment 100 using the camera 105. This captured image may be a partial picture of the real-world environment 100 (e.g., the camera only captures the image of a desired orientation such as the user's field of view or the peripheral views) or a full picture of the real-world environment 100 (e.g., the camera captures a full 360 degree image of the user's entire real-world surroundings). Although this disclosure describes accessing one or more images of the real-world environment in a particular manner, this disclosure contemplates accessing one or more images of the real-world environment in any suitable manner.

In particular embodiments, the computing system 110 may render, for the one or more displays of the VR display device 135, a second output image comprising a portion of the VR environment 140 and a portion of a passthrough view 130 of the real-world environment 100 based on the accessed images. The portion of the passthrough view 130 may be based on the determined direction of movement 125 and the field of view 120 of the user. The passthrough view 130 may provide the user a view of the real-world environment 100 beyond the VR environment 140 as the user approaches the virtual boundary 115, without drastically breaking the immersion of the VR environment. That is, as the user approaches the virtual boundary 115, the directional passthrough view 130 may be displayed on the VR display device 135 to give the user a sense of the direction the user is moving in the real-world environment 100, while maintaining the VR environment 140 everywhere else. Thus, the computing system may provide a solution to the technical challenge of conveying spatial information about the real-world environment 100 and real-world objects 145 within the real-world environment 100 to a user while the user is immersed in a VR experience in the VR environment 140. The solution presented herein may address this challenge by providing a quick glimpse via the portion of the directional passthrough view 130 to the real-world environment 100 so the user may ascertain where they are in the real-world environment 100. This may have the advantage of helping the user avoid objects they may run into if they continue along their trajectory or path, and also help the user orient themselves in the real-world environment 100. For example, the user may reposition themselves in the center of the virtual boundary 115 after viewing the directional passthrough view 130. As an example and not by way of limitation, and with reference to FIG. 2A, if the user is moving forward (e.g., in the direction of movement 125*a*) along the same direction as their field of view 120, the VR display device 135 may display the VR environment 140 and the portion of the passthrough view 130*a* that is directly in front of the user, while maintaining the VR environment 140 everywhere else. As another example and not by way of limitation, and with reference to FIG. 2B, if the user is moving backward (e.g., in the direction of movement 125*b*) in the opposite direction as their field of view 120, the VR display device 135 may display the VR environment 140 and the portion of the passthrough view 130b that covers the user's peripheral view and behind the user, while maintaining the VR environment 140 everywhere else. As another example and not by way of limitation, and with reference to FIG. 2C, if the user is moving sideways to the left (e.g., in the direction of movement 125c) and perpendicular to their field of view 120, the VR display device 135 may display the VR environment 140 and the portion of the passthrough view 130c that covers the user's peripheral view to the left, while maintaining the VR environment 140 everywhere else. As another example and not by way of limitation, and with reference to FIG. 2D, if the user is moving sideways to the right (e.g., in the direction of movement 125d) and perpendicular to their field of view 120, the VR display device 135 may display the VR environment 140 and the portion of the passthrough view 130d that covers the user's peripheral view to the right, while maintaining the VR environment 140 everywhere else. Thus, the computing system 110 can render the passthrough view 130 to alert the user to objects in their path, and to help the user orient themselves in the room. Thus, the embodiments may include the technical advantage of providing spatial information by providing quick glimpse of the real-world environment through directional passthrough views of the real-world environment while immersed in the VR environment. Although this disclosure describes rendering a particular output image in a particular manner, this disclosure contemplates rendering any suitable output image in any suitable manner.

FIGS. 3A-3D illustrates sample perspective views of the portion of the passthrough view 130 of the real-world environment 100 within the VR environment 140, without adjustments for the field of view 120. FIGS. 4A-4D illustrates sample perspective views of the portion of the passthrough view 130 of the real-world environment 100 within the VR environment 140, with adjustments for the field of view 120. The portion of the passthrough view 130 may be adjusted to be able to consistently notify the user when the user strays from the center of the virtual boundary, or when the user approaches the virtual boundary from any direction. This may be accomplished by increasing the size of the arc or area of the portion of the passthrough view 130 to ensure at least part of the portion of the passthrough view 130 is always within the field of view 120. This can provide the technical advantage of providing spatial information by determining the optimal direction for the directional passthrough view, regardless of which direction the user is moving. As an example and not by way of limitation, with reference to FIG. 3A, if the user is moving forward with the movement of direction 125 that is along the same direction as their field of view 120, the portion of the passthrough view 130 lies fully within the field of view 120, and thus may not need any adjustment. Therefore, with reference to FIG. 4A, there may be no adjustment of the portion of the passthrough view 130. As another example and not by way of limitation, with reference to FIG. 3B, if the user is moving with the movement of direction 125 that is angled away from their field of view 120, the portion of the passthrough view 130 and the field of view 120 do not completely overlap, and thus the portion of the passthrough view 130 may need adjustment. Therefore, with reference to FIG. 4B, there may be an adjustment to increase the portion of the portion of the passthrough view 130. For example, if the overlap of the field of view 120 and the portion of the passthrough view was 5 degrees (as in FIG. 3B), then the size of the portion of the passthrough view 130 may be increased by 30 degrees so that the overlap of the field of view 120 and the portion of the passthrough view 130 may be increased to 20 degrees (as in FIG. 4B). As another example and not by way of limitation, with reference to FIG. 3C, if the user is moving with the movement of direction 125 that is perpendicular to their field of view 120, the portion of the passthrough view 130 and the field of view 120 may not overlap at all, and thus the portion of the passthrough view 130 may need adjustment. Therefore, with reference to FIG. 4C, there may be an adjustment to increase the portion of the portion of the passthrough view 130. For example, if the overlap of the field of view 120 and the portion of the passthrough view was 0 degrees (as in FIG. 3C), then the size of the portion of the passthrough view 130 may be increased by 32 degrees so that the overlap of the field of view 120 and the portion of the passthrough view 130 may be increased to 15 degrees (as in FIG. 4C). As another example and not by way of limitation, with reference to FIG. 3D, if the user is moving with the movement of direction 125 that is opposite to their field of view 120, the portion of the passthrough view 130 and the field of view 120 may not overlap at all, and thus the portion of the passthrough view 130 may need adjustment. Therefore, with reference to FIG. 4D, there may be an adjustment to increase the portion of the portion of the passthrough view 130. For example, if the overlap of the field of view 120 and the portion of the passthrough view was 0 degrees (as in FIG. 3D), then the size of the portion of the passthrough view 130 may be increased by 190 degrees so that the overlap of the field of view 120 and the portion of the passthrough view 130 may be increased to 15 degrees (as in FIG. 4D). With the above field of view adjustments to the portion of the passthrough view 130, the computing system 110 may render the passthrough view 130 which can alert the user to objects in their path, and to help the user orient themselves in the room.

Figure 5A:
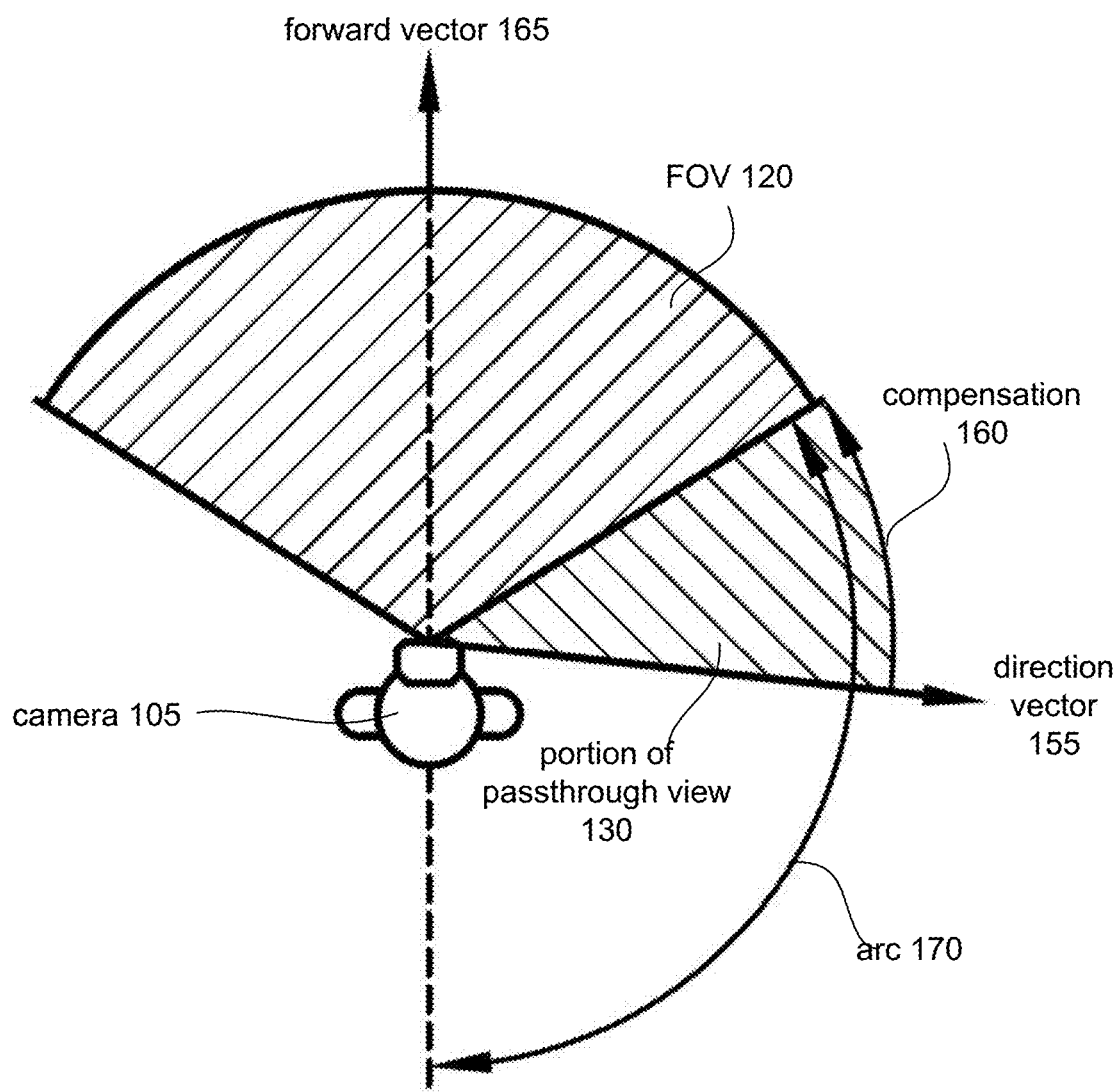
FIG. 5A illustrates a sample perspective view of a compensation for the adjustment of the field of view.

FIG. 5A illustrates a sample perspective view of a compensation 160 for the adjustment of the field of view 120. The direction of the field of view 120 may be represented by a forward vector 165. The direction of the user from the center of the virtual boundary 115 (not shown) may be represented by a direction vector 155. Based on the forward vector 165 and the direction vector 155, a compensation 160 may be determined to adjust the portion of the passthrough view 130. For example, as the angle between the forward vector 165 and the direction vector 155 increases (e.g., as the angle of the arc 170 decreases), the compensation 160 may increase as well. The compensation 160 is the angle that the direction vector 155 may need to rotate to reach the field of view 120, e.g., to ensure at least some of the portion of the passthrough view 130 lies within the field of view 120. The increase of the compensation 160 may be proportional to the decrease of the arc 170.

Figure 5B:
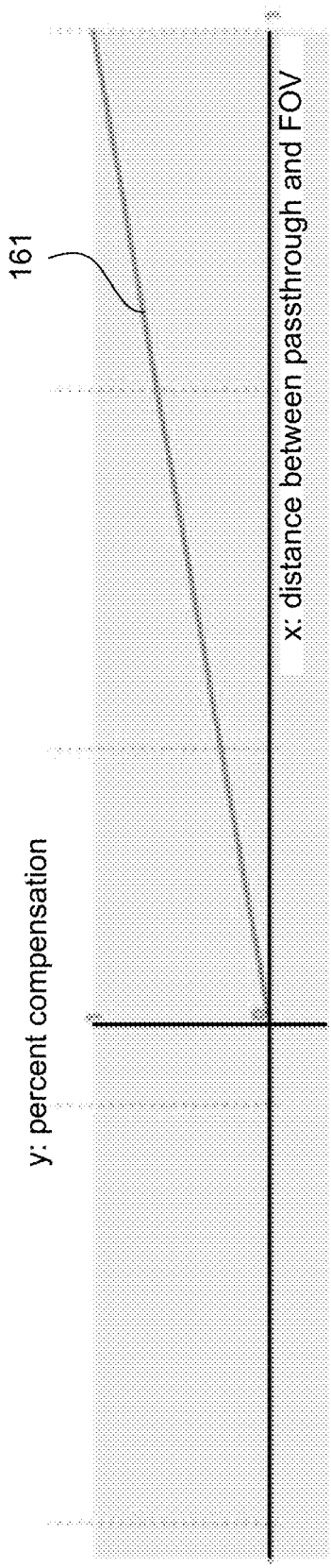
FIGS. 5B-5C are graphs illustrating the percent compensation of transitions into passthrough views.
Figure 5C:
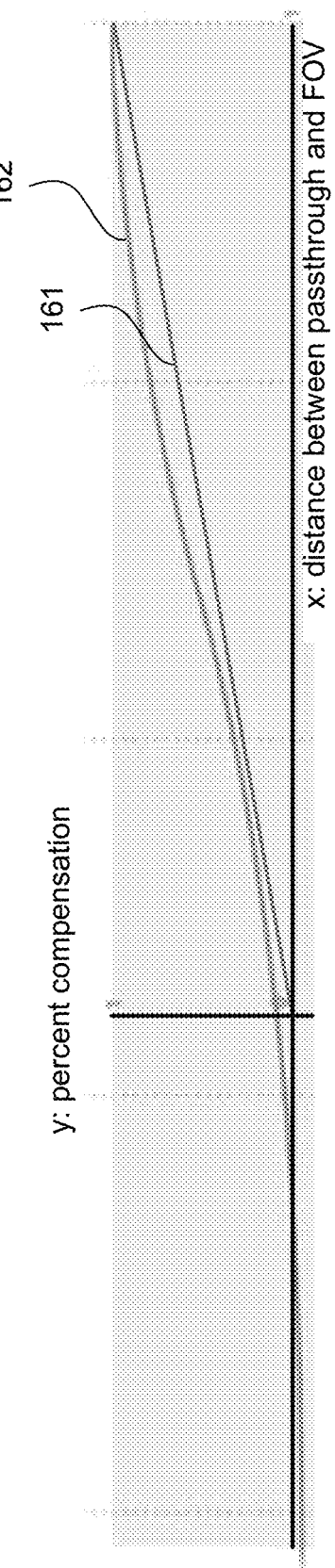

FIGS. 5B-5C are graphs illustrating the percent compensation of transitions into passthrough views. The x-axis represents the distance between the portion of the passthrough view and the field of view, with x=0 representing the portion of the passthrough view and the field of view are just not overlapping, and x=1 representing the portion of the passthrough view and the field of view are in opposite directions (e.g., the portion of the passthrough view points away from the field of view). The y-axis represents the percent compensation for the portion of the passthrough view. As shown by a percent compensation line 161 in FIG. 5B, once the user's direction of movement is out of the user's field of view (e.g., once the percent compensation line 161 crosses the y-axis), the compensation for the passthrough begins. As the sudden transition into the portion of the passthrough view may be very noticeable, the sudden transition may disrupt or distract from the VR experience. As shown by a percent compensation line 162 in FIG. 5C, the transition into passthrough view may be more gradual. The compensation for the passthrough view can gradually begin even before the user's direction of movement is out of the user's field of view (e.g., before the percent compensation line 162 crosses the y-axis), thus smoothing the transition into passthrough view. An advantage of having a smoothed transition into passthrough view includes having a less disruptive and more gradual introduction of the passthrough view, which may make it less noticeable to determine when the compensation starts and ends. Additionally, as the curve approaches x=1 (e.g., when the portion of the passthrough view and the field of view are in opposite directions), the compensation may increase the passthrough view to all sides of the user's vision, as seeing the passthrough view on all sides of the user's periphery may make it easier to notice objects and obstructions than just showing the passthrough view on one side.

In particular embodiments, referring again to FIGS. 2A-2D, 3A-3D, and 4A-4D, the computing system 110 may determine a speed of the movement of the user. An area (e.g., the size) of the portion of the passthrough view 130 may be based on the determined speed of the user. The portion of the passthrough view 130 may be a spherical cap of a spherical second output image (e.g., the portion of the passthrough view is a portion of a spherical surface, where the spherical surface corresponds to the a VR environment that is rendered on a "spherical dome" around the user). If the user is moving at faster speeds, then the area of the portion of the passthrough view 130 may be relatively larger for a faster determined speed of the movement of the user than it may be for a user moving at a slower determined speed. As such, the portion of the passthrough view may take up a larger area of the output image displayed by the VR display device 135. If the user is moving at slower speeds, then the area of the portion of the passthrough view 130 may be relatively smaller for a slower determined speed of the movement of the user than it may be for a user moving at a faster determined speed. As such, the portion of the passthrough view may take up a smaller area of the output image displayed by the VR display device 135. If the output image is rendered as a spherical dome around the user, then the portion of the VR passthrough view may be a spherical cap in the spherical dome. However, the portion of the passthrough view 130 may be any shape (e.g., the shape is not limited to a circular view for the portion of the passthrough view 130). As an example and not by way of limitation, if the user is walking at a fast pace toward the virtual boundary 115, the portion of the passthrough view 130 may appear be relatively larger than in it may be if the user walked toward the virtual boundary 115 at a slower pace. Conversely, if the user is walking slowly toward the virtual boundary 115, the portion of the passthrough view 130 may appear to be relatively smaller than it may be if the user walked toward the virtual boundary 115 at a faster pace. Although this disclosure describes determining a speed of the movement of the user in a particular manner, this disclosure contemplates determining a speed of the movement of the user in any suitable manner.

In particular embodiments, a sharpness of a transition from the VR environment 140 to the portion of the passthrough view 130 may be based on the determined speed of the movement of the user. The transition may be a fade, blur, or other form of visual interruption or transition from the VR environment 140 into the portion of the passthrough view 130. That is, when the transition from the VR environment 140 to the portion of the passthrough view 130 may involve fading or blurring the edges where the VR environment 140 and the portion of the passthrough view 130 meet. The sharpness of the transition from the VR environment 140 to the portion of the passthrough view 130 may be relatively sharper for a faster determined speed of the movement of the user, and the sharpness of the transition from the VR environment 140 to the portion of the passthrough view 130 may be relatively less sharp for a slower determined speed of the movement of the user. As an example and not by way of limitation, if the user is walking quickly toward the virtual boundary 115, there will be less fade or blur from the VR environment 140 to the portion of the passthrough view 130 (the transition from the VR environment 140 to the portion of the passthrough view 130 will be relatively sharper). This may allow the user to quickly assess obstacles that may be in the user's path, as faster user movement could increase the likelihood or risk of tripping over or running into an object. Conversely, if the user is walking slowly toward the virtual boundary 115, there will be more fade or blur from the virtual environment 140 to the portion of the passthrough view 130 (the transition from the VR environment 140 to the portion of the passthrough view 130 will be relatively less sharp). This may allow the user to assess their position in the real-world environment using the passthrough view, without greatly detracting from the user's VR experience (thus minimizing the disruption from the VR immersion and experience). Although this disclosure describes determining the speed of the movement of the user to determine the sharpness of the transition in a particular manner, this disclosure contemplates determining the speed of the movement of the user to determine the sharpness of the transition in any suitable manner.

Figure 6:
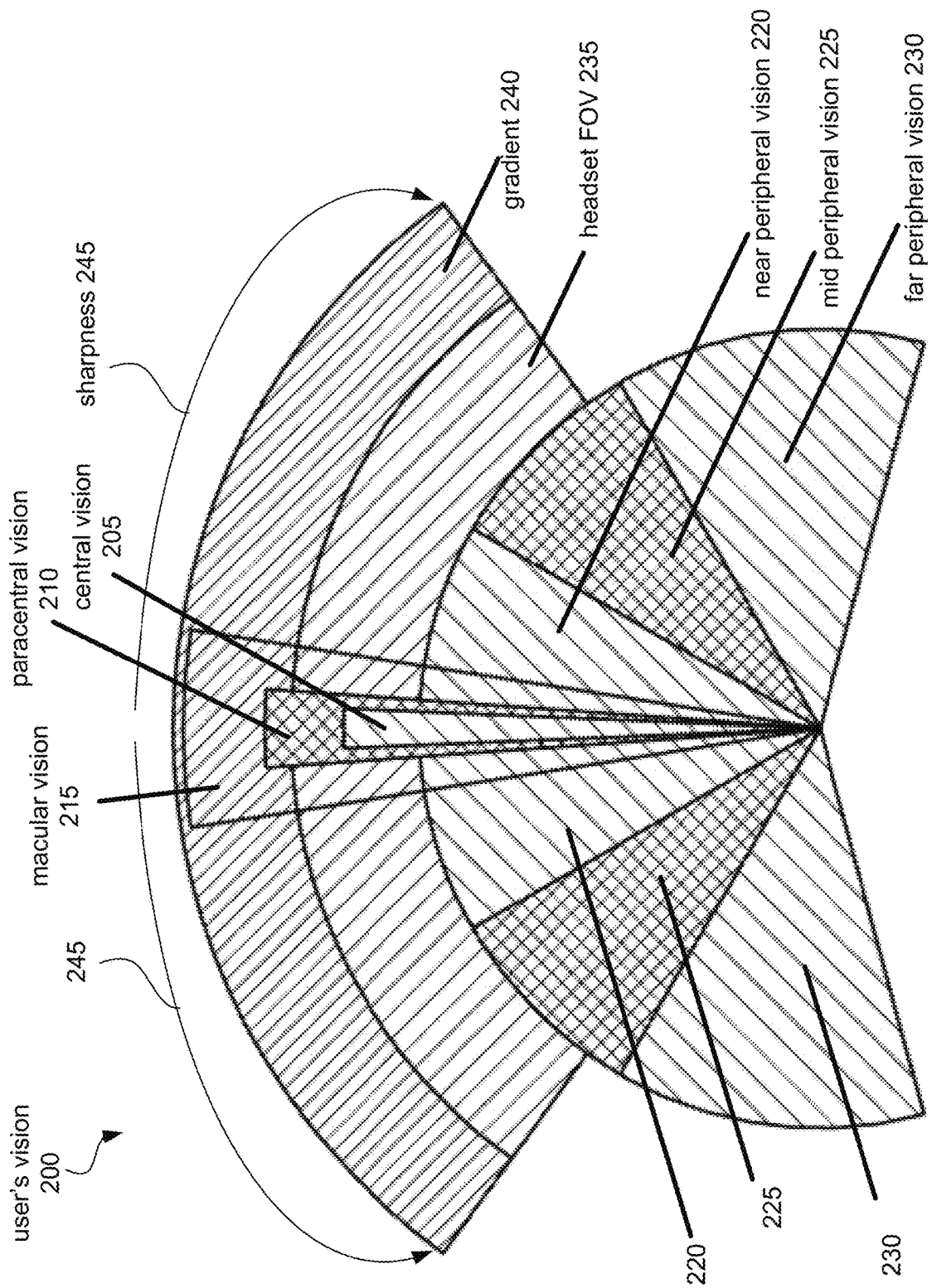
FIG. 6 illustrates a sample diagrammatic view of a user's vision.

FIG. 6 illustrates a sample diagrammatic view of a user's vision 200. The user may have central vision 205, paracentral vision 210, macular vision 215, near peripheral vision 220, mid peripheral vision 225, and far peripheral vision 230. As human peripheral vision may only be able to detect high contrast movement, it may be advantageous to have increased sharpness at the user's peripheral visions, while maintaining decreased sharpness (e.g., increased blurring or "feathering") near the center of the field of view to minimize the disruption of the VR experience. That is, for a headset field of view 235, a sharpness 245 of a gradient 240 of the passthrough view may be increased at the user's peripheral visions (e.g., near peripheral vision 220, mid peripheral vision 225, and far peripheral vision 230) to allow more visibility of the real-world environment where only high contrast movement may be detected. On the other hand, the sharpness 245 of the gradient 240 of the passthrough view may be decreased (e.g., by increasing the blur or "feathering" of the gradient 240) for the headset field of view 235 that corresponds to central vision 205, the paracentral vision 210, and the macular vision 215. Thus, the user may be able to detect visual objects and obstructions in the real-world environment more easily at their peripheral vision (e.g., their near peripheral vision 220, mid peripheral vision 225, and far peripheral vision 230), with the benefit of decreasing the distraction of the passthrough view near their central vision 205, paracentral vision 210, and macular vision 215. This may provide the user with more visual clarity of their surroundings without greatly interrupting or disrupting the VR experience.

In particular embodiments, referring to FIGS. 2A-2D, 3A-3D, and 4A-4D, the rendered portion of the passthrough view 130 may correspond to the direction of the movement 125 of the user. The location of the portion of the passthrough view 130 as displayed in the VR display device 135 may correspond to the direction of movement 125 of the user. If the user walks forward and straight, the portion of the passthrough view 130 may appear straight ahead of the user, centered in the user's field of view 120 and along the direction of movement 125. If the direction of movement 125 of the user is slightly forward and to the left, the portion of the passthrough view 130 as displayed in the VR display device 135 may appear along that direction of movement 125—ahead of and slightly to the left of the center of the user's field of view 120. As an example and not by way of limitation, the rendered portion of the passthrough view 130 may be in the field of view 120 of the user when the direction of movement 125 of the user is determined to be toward the field of view 120. As another example and not by way of limitation, the rendered portion of the passthrough view 130 may be in a peripheral view of the user when the direction of movement 125 is determined to be perpendicular to the field of view 120. That is, the field of view may be to the left or the right of the user's field of view 120, in the user's periphery. This may allow the user to use their peripheral view to be alerted to potential obstacles or objects that may lie in their path. As another example and not by way of limitation, the rendered portion of the passthrough view 130 may be in peripheral view of and behind the user when the direction of movement 125 is determined to be away from the field of view 120. That is, when the user is walking backwards in a direction opposite of their field of view 120, the portion of the passthrough view 130 may cover both the left and right sides of the user's peripheral view, as well as the portion behind the user (beyond the user's field of view 120 and the user's peripheral view).

Figure 7:
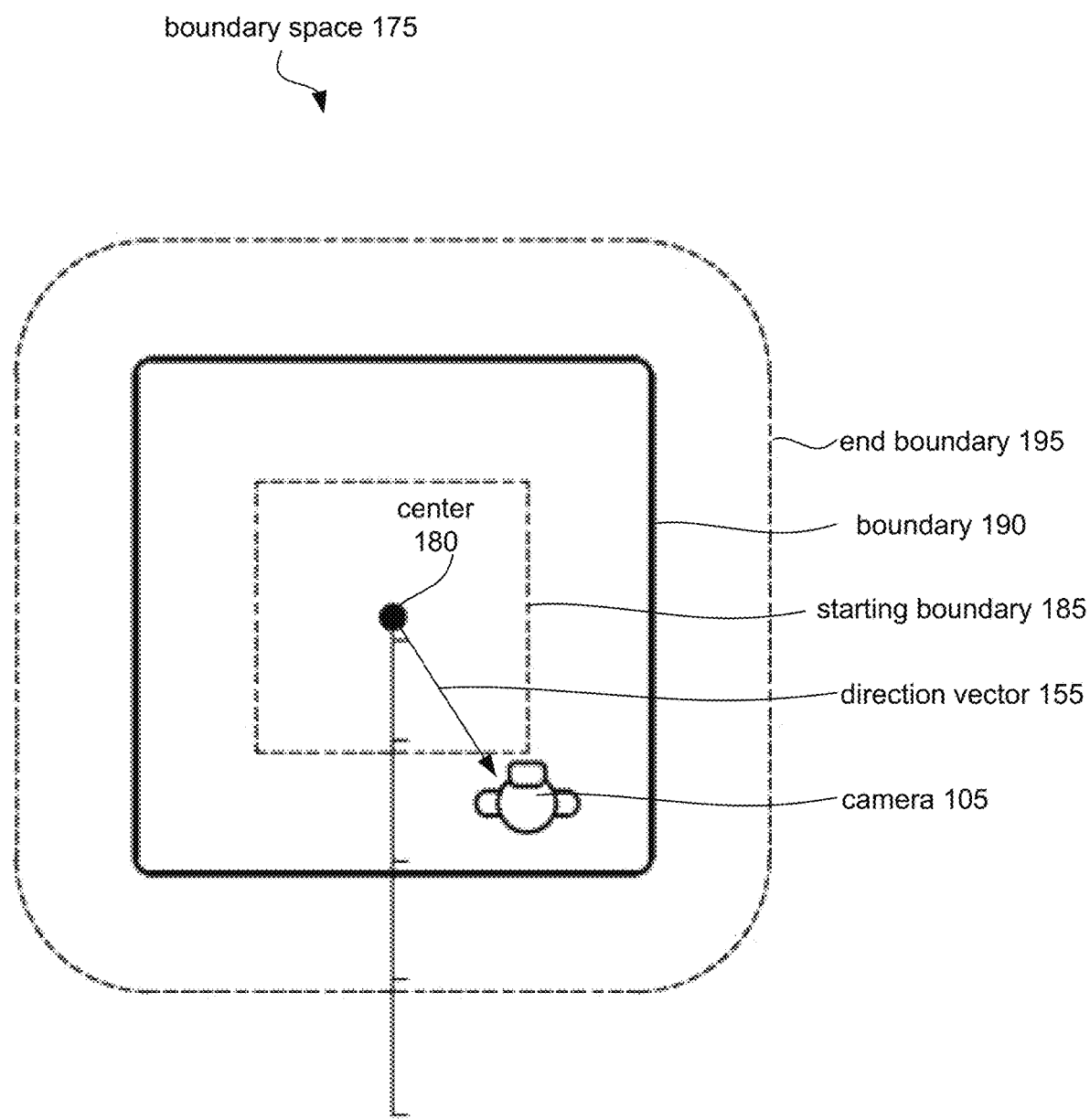
FIG. 7 illustrates a perspective view of the user in a boundary space.

FIG. 7 illustrates a perspective view of the user in a boundary space 175. The boundary space 175 may have a center 180 (which may, for example, correspond to the center of a real-world room in the real-world environment). The boundary space 175 may include a boundary 190 having one or more threshold boundaries that the user may want to customize. For example, the user may customize the boundary space 175 to include a starting threshold boundary 185, and an end boundary 195. Depending on the direction vector 155 of the user (e.g., as the user moves further away from or closer to the center of the boundary space 175), the computing system 110 (not shown) of the camera 105 may display on the VR display device 135 (not shown) the portion of the passthrough view with an increasing or decreasing size and sharpness. As an example, if the user is at the starting boundary 185, the size of the portion of the passthrough view may be relatively smaller than it may be if the user was at the boundary 190. The sharpness of the portion of the passthrough view may be relatively less sharp at the starting boundary 185 than it may be at the boundary 190. As another example, if the user is at the end boundary 195, the size of the portion of the passthrough view may be relatively larger than it may be if the user was at the boundary 190. The sharpness of the portion of the passthrough view may be relatively sharper at the end boundary 195 than it may be at the boundary 190.

Figure 8:
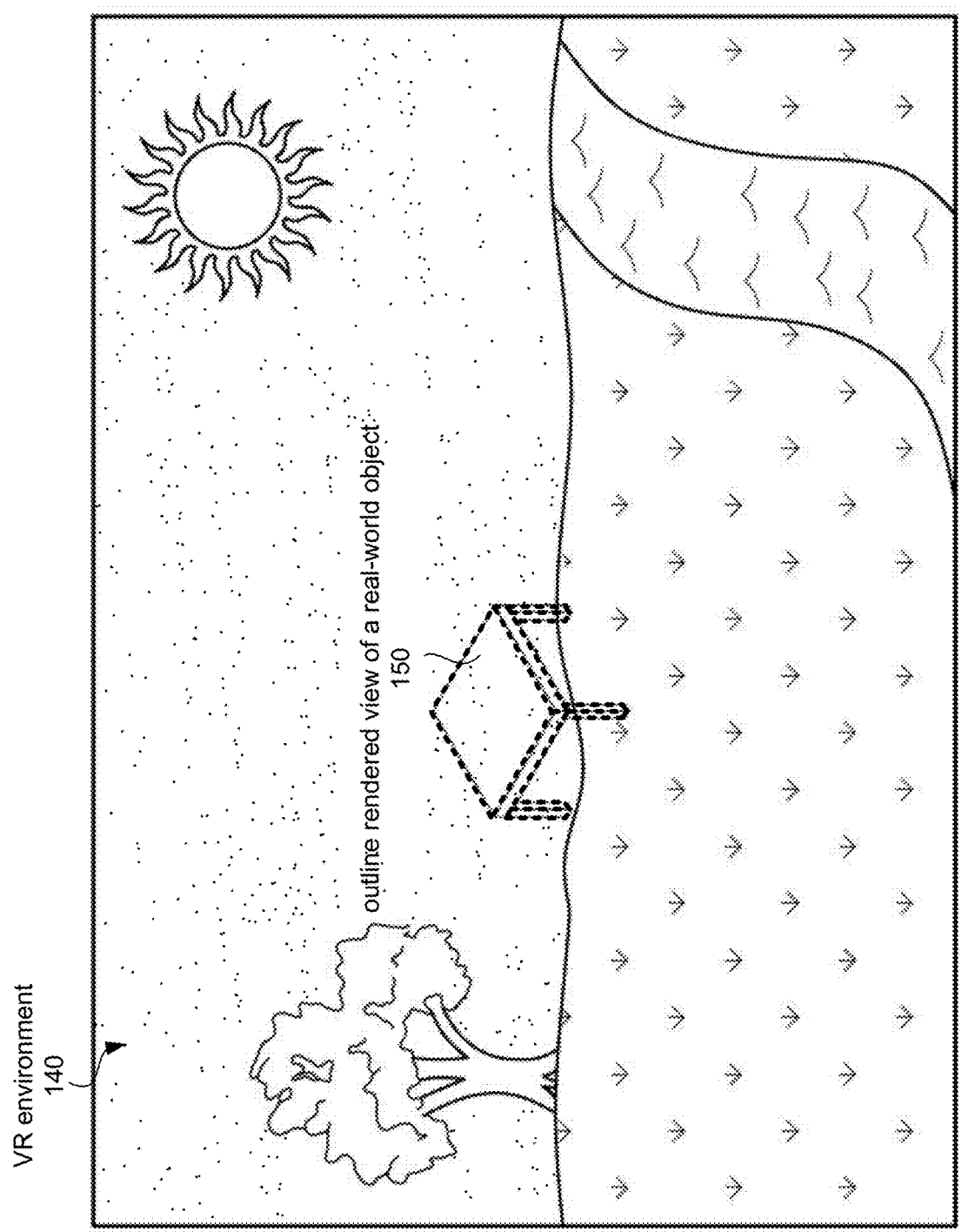
FIG. 8 illustrates a perspective view of an outline rendering view of a real-world object in the virtual reality environment.

FIG. 8 illustrates a perspective view of an outline rendering view of a real-world object 150 in the VR environment 140. Referring to FIGS. 1C and 8, in particular embodiments, the computing system 110 may render, for the one or more displays of the VR display device 135, a third output image comprising one or more real-world objects 145 beyond the virtual boundary as the outline rendering view of the real-world object 150, e.g., as one or more mixed reality (MR) objects. The outline rendering view of the real-world object 150 may correspond to the real-world object 145 that may lie beyond the virtual boundary 115. The outline rendered object may be rendered as an outline of the one or more real-world objects 145, a semi-opaque rendering of the one or more real-world objects 145, a fully opaque rendering of the one or more real-world objects 145, or other similar rendering. The outline rendered object may be used to alert the user to the presence of the one or more real-world objects 145 by showing the user the outline rendering view of the real-world object 150, which may correspond to the pose of the real-world object 145 in the real-world environment. That is, a technical advantage of the embodiments may include providing spatial information by providing outline renderings of real-world objects in the VR environment to alert the user of objects that may lie in their path without significantly disrupting the immersion of the VR experience. Thus, the user may be provided a safe and subtle alert or warning to the presence of an obstacle without frustrating the user VR experience or breaking the immersion. As an example and not by way of limitation, if the one or more real-world objects 145 (e.g., a desk) lies beyond the virtual boundary 115 (as illustrated in FIG. 1C), then the one or more real-world objects 145 may appear as an outline rendered object (e.g., the MR object of the outline rendering view of the real-world object 150) in in the user's VR display device 135. While in the VR environment 140, the user may be able to see a "ghostly" semi-opaque outline of the object 145 (e.g., a desk) without having to leave the VR environment 140. The outline rendering view of the real-world object 150 may alert the user to avoid the desk and continue on in the VR experience. The outline rendered object (e.g., the rendered outline of the desk) can fade into view and then fade away as the user walks away from the desk, for example, if the computing system determines the real-world object (e.g., the desk) does not pose a risk to the user. Thus, the computing system 110 may provide a solution to the technical challenge of maintaining the immersion of the VR experience while also providing the user with the necessary visual information to orient themselves in the virtual boundary. The solution presented herein may address this challenge by rendering an opaque, translucent, or otherwise outline rendered view of the real-world object 150 in the VR environment 140 to alert the user to the presence of the real-world object 145, without significantly interrupting the VR experience. Although this disclosure describes rendering a third output image in a particular manner, this disclosure contemplates rendering any suitable output image in any suitable manner.

In particular embodiments, the computing system 110 may determine whether the user is approaching within a second threshold distance of the virtual boundary 115. The second threshold distance may be greater than the first threshold distance. For example, if the first threshold distance is 1 meter from the virtual boundary 115, the second threshold distance may be 2 meters from the virtual boundary 115. Although this disclosure describes determining whether the user is approaching within a second threshold distance in a particular manner, this disclosure contemplates determining whether the user is approaching within any threshold distance in any suitable manner.

In particular embodiments, referring to FIGS. 1C, 2A-2D, and 8, the computing system 110 may determine, responsive to the user approaching within the second threshold distance of the virtual boundary 115, the direction of movement 125 and the field of view 120 of the user. As described above, the computing system 110 may determine the direction of movement 125 and the field of view 120 of the user using sensors, accelerometers, gyroscopes, or other position sensors of the camera 105 and/or the VR display device 135 to determine the motion and orientation of the user wearing the camera 105 and/or the VR display device 135. As an example and not by way of limitation, sensors may determine the user is moving forward (e.g., in the direction of movement 125a) along the same direction as their field of view 120 and approaching within the second threshold distance of the virtual boundary 115 (FIG. 2A). As another example and not by way of limitation, sensors may determine the user is moving backward (e.g., in the direction of movement 125b) in the opposite direction as their field of view 120 and approaching within the second threshold distance of the virtual boundary 115 (FIG. 2B). As another example and not by way of limitation, sensors may determine the user is moving sideways to the left (e.g., in the direction of movement 125c) and perpendicular to their field of view 120 and approaching within the second threshold distance of the virtual boundary 115 (FIG. 2C). As another example and not by way of limitation, sensors may determine the user is moving sideways to the right (e.g., in the direction of movement 125d) and perpendicular to their field of view 120 and approaching within the second threshold distance of the virtual boundary 115 (FIG. 2D). Although this disclosure describes determining the direction of movement 125 and the field of view 120 of the user in a particular manner, this disclosure contemplates determining the direction of movement and the field of view of the user in any suitable manner.

In particular embodiments, the computing system 110 may access one or more additional images of the real-world environment 100 containing the one or more real-world objects 145 captured by cameras 105 of the VR display device 135. The third output image may have the one or more real-world objects 145 in the accessed additional images. The computing system 110 may access one or more images of the real-world environment 100 by taking a picture or snapshot (e.g., capturing an image) of the user's real-world environment 100 using the camera 105. An object detection filter or an edge detection filter (e.g., a Sobel filter) may detect the one or more real-world objects 145 in the vicinity of the user's real-world environment 100. As an example and not by way of limitation, the camera 105 may be used to detect the edges of the one or more real-world objects 145, such as a desk, that is in the user's real-world environment 100. The third output image may then include the desk that was captured by the camera 105. Although this disclosure describes accessing one or more additional images in a particular manner, this disclosure contemplates accessing images in any suitable manner.

Figure 9:
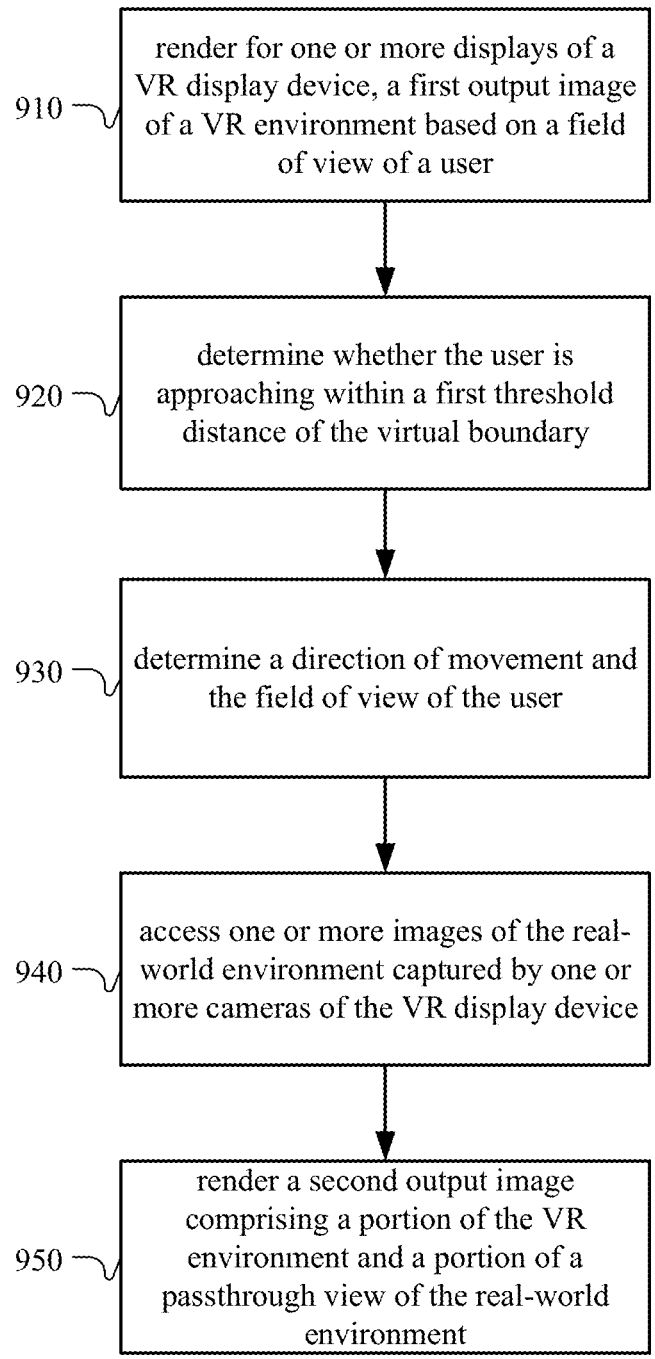
FIG. 9 illustrates an example method for determining spatial awareness in a VR setting using a passthrough view.

FIG. 9 illustrates an example method 900 for determining spatial awareness in a VR setting using a passthrough view. The method may begin at step 910, where a computing system may include rendering for one or more displays of a VR display device 135, a first output image of a VR environment based on a field of view of a user, wherein the VR environment comprises a virtual boundary corresponding to a real-world environment. At step 920, the method may include determining whether the user is approaching within a first threshold distance of the virtual boundary. At step 930, the method may include determining responsive to the user approaching within the first threshold distance of the virtual boundary, a direction of movement and the field of view of the user. At step 940, the method may include accessing one or more images of the real-world environment captured by one or more cameras of the VR display device. At step 950, the method may include rendering, for the one or more displays of the VR display device, a second output image comprising a portion of the VR environment and a portion of a passthrough view of the real-world environment based on the accessed images, wherein the portion of the passthrough view is based on the determined direction of movement and the field of view of the user. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for determining spatial awareness in a VR setting using a passthrough view including the particular steps of the method of FIG. 9, this disclosure contemplates any suitable method for determining spatial awareness in a VR setting using a passthrough view including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
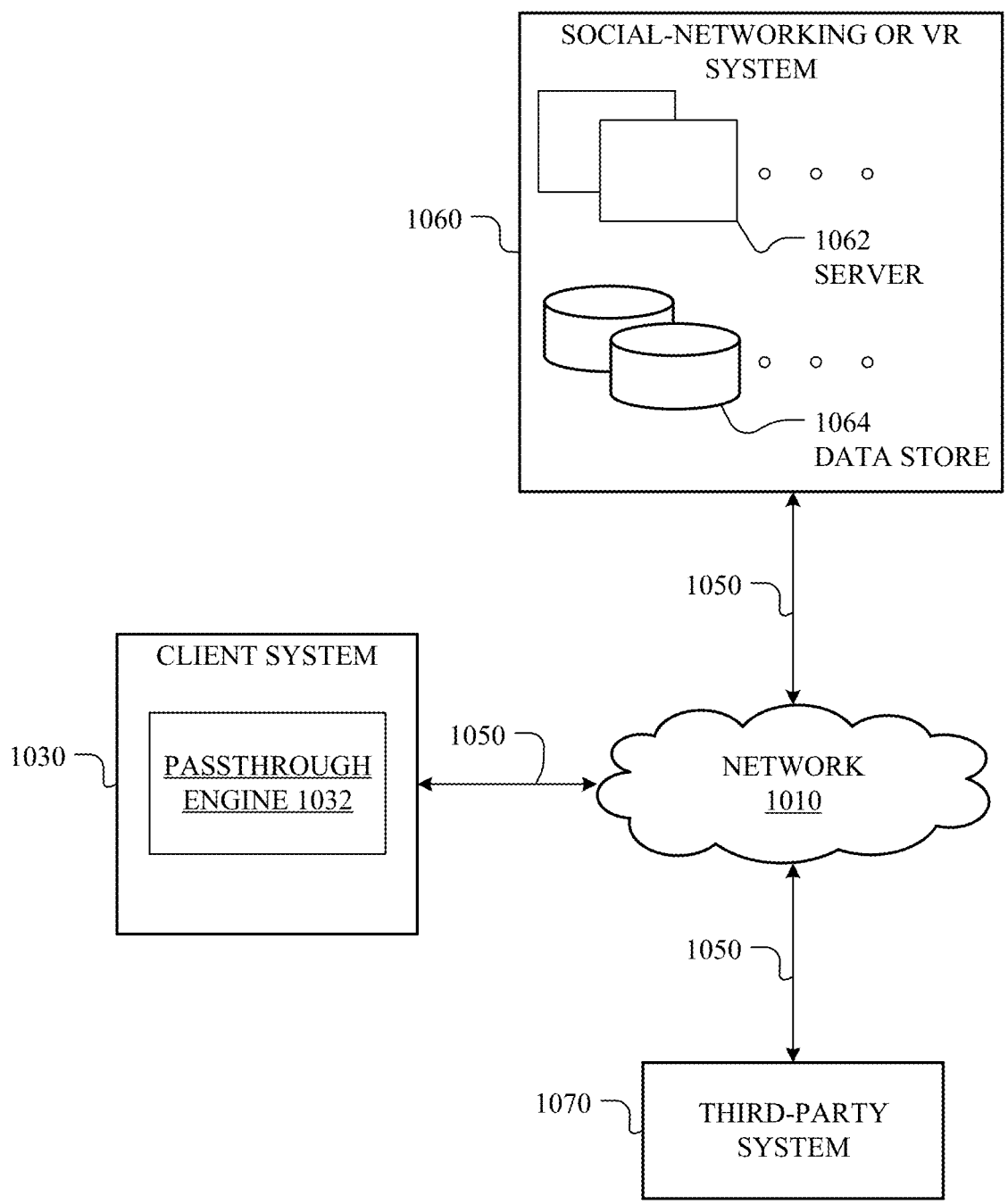
FIG. 10 illustrates an example network environment associated with a VR or social-networking system.

FIG. 10 illustrates an example network environment 1000 associated with a VR or social-networking system. Network environment 1000 includes a client system 1030, a VR or social-networking system 1060, and a third-party system 1070 connected to each other by a network 1010. Although FIG. 10 illustrates a particular arrangement of client system 1030, VR or social-networking system 1060, third-party system 1070, and network 1010, this disclosure contemplates any suitable arrangement of client system 1030, VR or social-networking system 1060, third-party system 1070, and network 1010. As an example and not by way of limitation, two or more of client system 1030, VR or social-networking system 1060, and third-party system 1070 may be connected to each other directly, bypassing network 1010. As another example, two or more of client system 1030, VR or social-networking system 1060, and third-party system 1070 may be physically or logically co-located with each other in whole or in part. Moreover, although FIG. 10 illustrates a particular number of client systems 1030, VR or social-networking systems 1060, third-party systems 1070, and networks 1010, this disclosure contemplates any suitable number of client systems 1030, VR or social-networking systems 1060, third-party systems 1070, and networks 1010. As an example and not by way of limitation, network environment 1000 may include multiple client system 1030, VR or social-networking systems 1060, third-party systems 1070, and networks 1010.

This disclosure contemplates any suitable network 1010. As an example and not by way of limitation, one or more portions of network 1010 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, client system 1030 (e.g., an HMD) may include a passthrough engine 1032 to provide the passthrough feature described herein, and may have one or more add-ons, plug-ins, or other extensions. A user at client system 1030 may connect to a particular server (such as server 1062, or a server associated with a third-party system 1070). The server may accept the request and communicate with the client system 1030.

In particular embodiments, VR or social-networking system 1060 may be a network-addressable computing system that can host an online Virtual Reality environment or social network. VR or social-networking system 1060 may generate, store, receive, and send social-networking data, such as, for example, user-profile data, concept-profile data, social-graph information, or other suitable data related to the online social network. Social-networking or VR system 1060 may be accessed by the other components of network environment 1000 either directly or via network 1010. As an example and not by way of limitation, client system 1030 may access social-networking or VR system 1060 using a web browser, or a native application associated with social-networking or VR system 1060 (e.g., a mobile social-networking application, a messaging application, another suitable application, or any combination thereof) either directly or via network 1010. In particular embodiments, social-networking or VR system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking or VR system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking or VR system 1060, or a third-party system 1070 to manage, retrieve, modify, add, or delete, the information stored in data store 1064.

In particular embodiments, social-networking or VR system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 1060 may provide users of the online social network the ability to communicate and interact with other users. In particular embodiments, users may join the online social network via social-networking or VR system 1060 and then add connections (e.g., relationships) to a number of other users of social-networking or VR system 1060 to whom they want to be connected. Herein, the term "friend" may refer to any other user of social-networking or VR system 1060 with whom a user has formed a connection, association, or relationship via social-networking or VR system 1060.

In particular embodiments, social-networking or VR system 1060 may provide users with the ability to take actions on various types of items or objects, supported by social-networking or VR system 1060. As an example and not by way of limitation, the items and objects may include groups or social networks to which users of social-networking or VR system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 1060 or by an external system of third-party system 1070, which is separate from social-networking or VR system 1060 and coupled to social-networking or VR system 1060 via a network 1010.

In particular embodiments, social-networking or VR system 1060 may be capable of linking a variety of entities. As an example and not by way of limitation, social-networking or VR system 1060 may enable users to interact with each other as well as receive content from third-party systems 1070 or other entities, or to allow users to interact with these entities through an application programming interfaces (API) or other communication channels.

In particular embodiments, a third-party system 1070 may include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking or VR system 1060. In particular embodiments, however, social-networking or VR system 1060 and third-party systems 1070 may operate in conjunction with each other to provide social-networking services to users of social-networking or VR system 1060 or third-party systems 1070. In this sense, social-networking or VR system 1060 may provide a platform, or backbone, which other systems, such as third-party systems 1070, may use to provide social-networking services and functionality to users across the Internet.

In particular embodiments, a third-party system 1070 may include a third-party content object provider. A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 1060 also includes user-generated content objects, which may enhance a user's interactions with social-networking or VR system 1060. User-generated content may include anything a user can add, upload, send, or "post" to social-networking or VR system 1060. As an example and not by way of limitation, a user communicates posts to social-networking or VR system 1060 from a client system 1030. Posts may include data such as status updates or other textual data, location information, photos, videos, links, music or other similar data or media. Content may also be added to social-networking or VR system 1060 by a third-party through a "communication channel," such as a newsfeed or stream.

In particular embodiments, social-networking or VR system 1060 may include a variety of servers, sub-systems, programs, modules, logs, and data stores. In particular embodiments, social-networking or VR system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 1060 may also include suitable components such as network interfaces, security mechanisms, load balancers, failover servers, management-and-network-operations consoles, other suitable components, or any suitable combination thereof. In particular embodiments, social-networking or VR system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 1060 to one or more client systems 1030 or one or more third-party system 1070 via network 1010. The web server may include a mail server or other messaging functionality for receiving and routing messages between social-networking or VR system 1060 and one or more client systems 1030. An API-request server may allow a third-party system 1070 to access information from social-networking or VR system 1060 by calling one or more APIs. An action logger may be used to receive communications from a web server about a user's actions on or off social-networking or VR system 1060. In conjunction with the action log, a third-party content-object log may be maintained of user exposures to third-party content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking or VR system 1060. A privacy setting of a user determines how particular information associated with a user may be shared. The authorization server may allow users to opt in to or opt out of having their actions logged by social-networking or VR system 1060 or shared with other systems (e.g., third-party system 1070), such as, for example, by setting appropriate privacy settings. Third-party content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
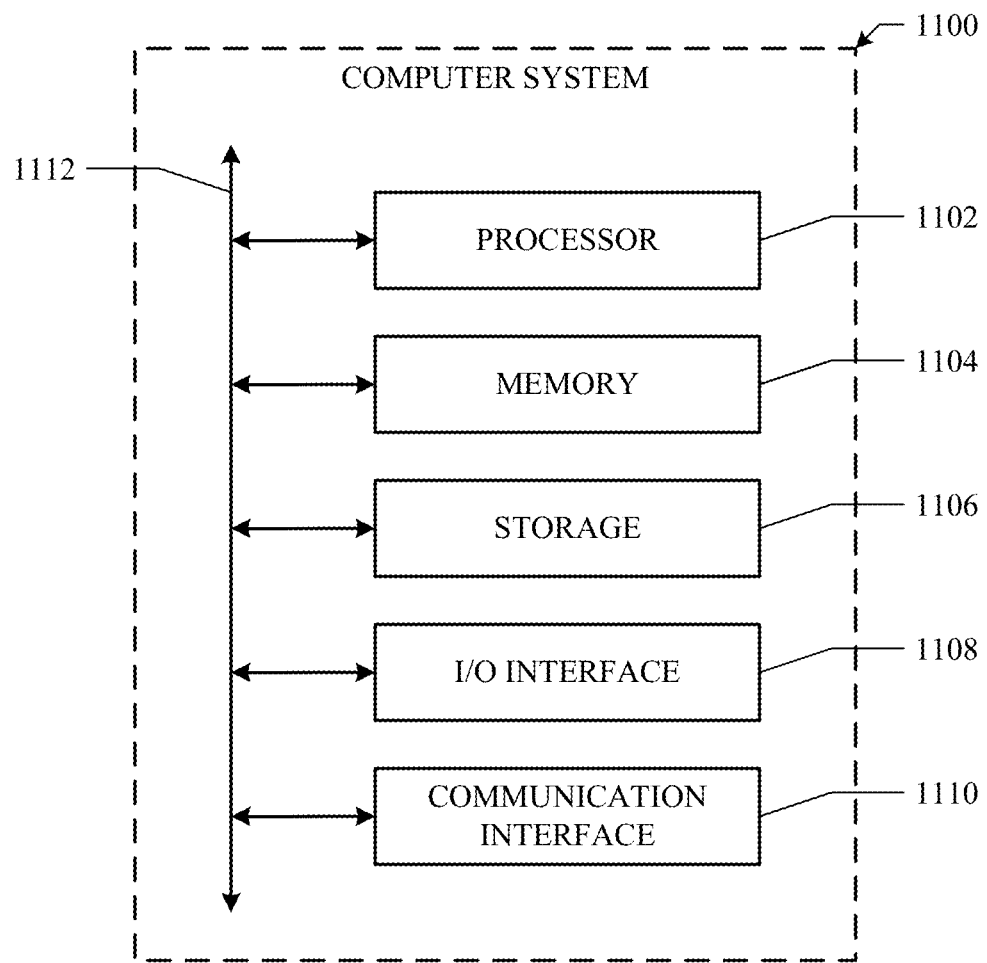
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-onchip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    rendering, for one or more displays of a virtual reality (VR) display device, a first output image of a VR environment based on a field of view of a user, wherein the VR environment comprises a virtual boundary corresponding to a real-world environment;
    determining whether the user has approached within a first threshold distance of the virtual boundary;
    determining, responsive to the user approaching within the first threshold distance of the virtual boundary, a direction of movement and the field of view of the user;

accessing one or more images of the real-world environment captured by one or more cameras of the VR display device; and rendering, for the one or more displays of the VR display device, a second output image comprising a portion of the VR environment and a portion of a passthrough view of the real-world environment based on the accessed images, wherein the portion of the passthrough view is based on the determined direction of movement and the field of view of the user.

2. The method of claim 1, further comprising:

rendering, for the one or more displays of the VR display device, a third output image comprising one or more real-world objects beyond the virtual boundary as one or more mixed reality (MR) objects.

3. The method of claim 2, further comprising:

determining whether the user is approaching within a second threshold distance of the virtual boundary, wherein the second threshold distance is greater than the first threshold distance;

determining, responsive to the user approaching within the second threshold distance of the virtual boundary, the direction of movement and the field of view of the user; and accessing one or more additional images of the real-world environment containing the one or more real-world objects captured by cameras of the VR display device;

wherein the third output image comprises the one or more real-world objects in the accessed additional images.

4. The method of claim 2, wherein the one or more MR objects are rendered as an outline of the one or more objects, a semi-opaque rendering of the one or more objects, or a fully opaque rendering of the one or more objects.

5. The method of claim 1, further comprising:

determining a speed of the movement of the user, wherein an area of the portion of the passthrough view is based on the determined speed of the user, wherein the portion is a spherical cap of a spherical second output image.

6. The method of claim 5, wherein the area of the portion of the passthrough view is relatively larger for a faster determined speed of the movement of the user, and wherein the area of the portion of the passthrough view is relatively smaller for a slower determined speed of the movement of the user.

7. The method of claim 1, further comprising:

determining a speed of the movement of the user, wherein a sharpness of a transition from the VR environment to the portion of the passthrough view is based on the determined speed of the movement of the user, wherein the transition is a fade from the VR environment into the portion of the passthrough view.

8. The method of claim 7, wherein the sharpness of the transition from the VR environment to the portion of the passthrough view is relatively sharper for a faster determined speed of the movement of the user, and wherein the sharpness of the transition from the VR environment to the portion of the passthrough view is relatively less sharp for a slower determined speed of the movement of the user.

9. The method of claim 1, wherein the rendered portion of the passthrough view corresponds to the direction of movement of the user.

10. The method of claim 9, wherein the rendered portion of the passthrough view is in the field of view of the user when the direction of movement of the user is determined to be toward the field of view.

11. The method of claim 9, wherein the rendered portion of the passthrough view is in a peripheral view of the user when the direction of movement is determined to be perpendicular to the field of view.

12. The method of claim 9, wherein the rendered portion of the passthrough view is in a peripheral view of and behind the user when the direction of movement is determined to be away from the field of view.

13. One or more computer-readable non-transitory storage media embodying software that is operable when executed to:

render, for one or more displays of a virtual reality (VR) display device, a first output image of a VR environment based on a field of view of a user, wherein the VR environment comprises a virtual boundary corresponding to a real-world environment;

determine whether the user is approaching within a first threshold distance of the virtual boundary;

determine, responsive to the user approaching within the first threshold distance of the virtual boundary, a direction of movement and the field of view of the user;

access one or more images of the real-world environment captured by cameras of the VR display device; and render, for the one or more displays of the VR display device, a second output image comprising a portion of the VR environment and a portion of a passthrough view of the real-world environment based on the accessed images, wherein the portion of the passthrough view is based on the determined direction of movement and the field of view of the user.

14. The media of claim 13, wherein the software is further operable when executed to:

render, for the one or more displays of the VR display, a third output image comprising one or more real-world objects beyond the virtual boundary as one or more mixed reality (MR) objects.

15. The media of claim 14, wherein the software is further operable when executed to:

determine whether the user is approaching within a second threshold distance of the virtual boundary, wherein the second threshold distance is greater than the first threshold distance;

determine, responsive to the user approaching within the second threshold distance of the virtual boundary, the direction of movement and the field of view of the user; and access one or more images of the real-world environment containing the one or more real-world objects captured by cameras of the VR display device.

16. The media of claim 14, wherein the rendered one or more MR object is rendered as one or more of an outline of the object, a semi-opaque rendering of the object, or a fully opaque rendering of the object.

17. The media of claim 13, wherein the software is further operable when executed to:

determine a speed of the movement of the user, wherein an area of the portion of the passthrough view is based on the determined speed of the user, wherein the area is an arc of the second output image.

18. The media of claim 17, wherein the area of the portion of the passthrough view is relatively larger for a faster determined speed of the movement of the user will, and wherein the area of the portion of the passthrough view is relatively smaller for a slower determined speed of the movement of the user.

19. The media of claim 13, wherein the software is further operable when executed to:

determining a speed of the movement of the user, wherein a sharpness of a transition from the VR environment to the portion of the passthrough view is based on the determined speed of the movement of the user, wherein the transition is a fade from the VR environment into the portion of the passthrough view.

20. A system comprising: one or more processors; and a non-transitory memory coupled to the processors comprising instructions executable by the processors, the processors operable when executing the instructions to:

render, for one or more displays of a virtual reality (VR) display device, a first output image of a VR environment based on a field of view of a user, wherein the VR environment comprises a virtual boundary corresponding to a real-world environment;

determine whether the user is approaching within a first threshold distance of the virtual boundary;

determine, responsive to the user approaching within the first threshold distance of the virtual boundary, a direction of movement and the field of view of the user;

access one or more images of the real-world environment captured by cameras of the VR display device; and render, for the one or more displays of the VR display device, a second output image comprising a portion of the VR environment and a portion of a passthrough view of the real-world environment based on the accessed images, wherein the portion of the passthrough view is based on the determined direction of movement and the field of view of the user.

* * * * *